(12) United States Patent
Yoon et al.

(10) Patent No.: US 11,556,246 B2
(45) Date of Patent: Jan. 17, 2023

(54) ELECTRONIC DEVICE AND CONTROL METHOD THEREOF

(71) Applicant: Samsung Electronics Co., Ltd., Gyeonggi-do (KR)

(72) Inventors: Youngmin Yoon, Gyeonggi-do (KR); Yejin Kim, Gyeonggi-do (KR); Haeree Na, Gyeonggi-do (KR); Jihyun Ahn, Gyeonggi-do (KR); Youngil Oh, Gyeonggi-do (KR); Jonghyun Han, Gyeonggi-do (KR); Younghak Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/030,461

(22) Filed: Sep. 24, 2020

(65) Prior Publication Data

US 2021/0096742 A1    Apr. 1, 2021

(30) Foreign Application Priority Data

Sep. 30, 2019    (KR) .................. 10-2019-0120926

(51) Int. Cl.
| | | |
|---|---|---|
| *G06F 3/048* | (2013.01) | |
| *G06F 3/04886* | (2022.01) | |
| *G06F 3/041* | (2006.01) | |
| *G06F 3/16* | (2006.01) | |

(Continued)

(52) U.S. Cl.
CPC ........ *G06F 3/04886* (2013.01); *G06F 1/1641* (2013.01); *G06F 1/1652* (2013.01); *G06F 1/1681* (2013.01); *G06F 3/04186* (2019.05); *G06F 3/167* (2013.01); *G10L 15/26* (2013.01);
(Continued)

(58) Field of Classification Search
CPC ............ G06F 3/04886; G06F 3/04186; G06F 1/1641; G06F 1/1652; G06F 1/1681; G06F 3/167; G10L 15/26
See application file for complete search history.

(56) References Cited

U.S. PATENT DOCUMENTS

| | | | |
|---|---|---|---|
| 9,690,381 B2 * | 6/2017 | Levesque ................ G06F 3/041 |
| 10,180,704 B1 * | 1/2019 | Stewart ................ G06F 1/1681 |
| 10,509,560 B2 | 12/2019 | Kim et al. | |

(Continued)

FOREIGN PATENT DOCUMENTS

| | | |
|---|---|---|
| JP | 4241544 B2 | 3/2009 |
| KR | 10-2017-0043076 A | 4/2017 |

(Continued)

OTHER PUBLICATIONS

International Search Report dated Jan. 29, 2021.

*Primary Examiner* — David Phantana-angkool
(74) *Attorney, Agent, or Firm* — Cha & Reiter, LLC

(57) ABSTRACT

An electronic device and method are disclosed. The electronic device includes a foldable display that is at least partially foldable, at least one processor, and at least one memory. The processor implements the method, including detecting, by at least one processor, that a foldable display of the electronic device changes from an unfolded state to a partially folded state, configuring a first region of the foldable display to accept touch inputs in the partially folded state, and configuring a second region of the foldable display to accept non-touch inputs in the partially folded state.

20 Claims, 13 Drawing Sheets

(51) Int. Cl.
  *G06F 1/16* (2006.01)
  *G10L 15/26* (2006.01)
(52) U.S. Cl.
  CPC ............. *G06F 2203/04108* (2013.01); *G06F 2203/04803* (2013.01)

(56) References Cited

U.S. PATENT DOCUMENTS

| | | | |
|---|---|---|---|
| 10,534,534 B2* | 1/2020 | Cheong | G06F 3/0481 |
| 11,081,090 B2* | 8/2021 | Heo | G06F 3/04886 |
| 11,137,894 B1* | 10/2021 | Chen | G06F 3/04855 |
| 11,178,342 B2* | 11/2021 | Tong | G06F 1/1652 |
| 2015/0286288 A1* | 10/2015 | Lee | G06F 3/016 |
| | | | 345/173 |
| 2015/0325216 A1* | 11/2015 | Park | G06F 1/1641 |
| | | | 345/634 |
| 2015/0370317 A1 | 12/2015 | Cha | |
| 2016/0179236 A1* | 6/2016 | Shin | G06F 3/04817 |
| | | | 345/173 |
| 2017/0185215 A1 | 6/2017 | Kim et al. | |
| 2017/0185289 A1 | 6/2017 | Kim et al. | |
| 2019/0179425 A1 | 6/2019 | Seo et al. | |
| 2020/0126519 A1* | 4/2020 | Heo | G06F 3/04845 |
| 2020/0174653 A1* | 6/2020 | Klein | G06F 3/04886 |
| 2020/0174660 A1* | 6/2020 | Klein | G06F 3/04883 |
| 2021/0014591 A1* | 1/2021 | Kim | H04S 7/30 |
| 2021/0096740 A1* | 4/2021 | Klein | G06F 3/0489 |
| 2021/0096741 A1* | 4/2021 | Klein | G06F 1/1647 |
| 2021/0117073 A1* | 4/2021 | Jung | G06V 10/17 |
| 2021/0306446 A1* | 9/2021 | Choi | H05K 5/0017 |

FOREIGN PATENT DOCUMENTS

| | | |
|---|---|---|
| KR | 10-2017-0077434 A | 7/2017 |
| WO | 2016/052814 A1 | 4/2016 |
| WO | 2017/065475 A1 | 4/2017 |

* cited by examiner

ELECTRONIC DEVICE AND CONTROL METHOD THEREOF

CROSS-REFERENCE TO RELATED APPLICATION(S)

This application is based on and claims priority under 35 U.S.C. 119 to Korean Patent Application No. 10-2019-0120926, filed on Sep. 30, 2019, in the Korean Intellectual Property Office, the disclosure of which is herein incorporated by reference in its entirety.

BACKGROUND

1) Field

Various embodiments relate to an electronic device and a method for configuring regions of a flexible touch sensitive display of the electronic device to receive different types of touch inputs.

2) Description of Related Art

Various electronic devices, such as a smart phone, a tablet PC, a portable multimedia player (PMP), a personal digital assistant (PDA), a laptop personal computer, and a wearable device, are popularized.

Recently, electronic devices with large screens have become more popular. These electronic devices include large foldable or rollable displays, which enable more compact stowing. Large display devices may provide various modes and functions that specially utilize the provided larger display areas. For example, the large screens may be split into multiple segments, providing a split screen mode in which different screens are displayed on the segments, respectively.

The split screen mode may be more effective in display a variety of information on a large screen, thereby increasing the efficiency by leveraging the larger screen.

The above information is presented as background information only to assist with an understanding of the disclosure. No determination has been made, and no assertion is made, as to whether any of the above might be applicable as prior art with regard to the disclosure.

SUMMARY

An electronic device including a foldable display may be used while the display is partially folded (e.g. while a split screen mode is activated). However, when the display is partially folded and one region of the display is placed on the floor while the other region is distal from the floor, a touch input to the region distal from the floor may cause movement of the device, resulting in inconveniences in accuracy for the touch input.

Further, even though the display is divided in different sub-areas, the same touch input method is utilized to the divided display sub-areas. Thus, a user of the electronic device must perform a touch input in order to execute a desired function (e.g. object selection) in each region. For example, in order to select an object displayed on the region distal from the floor, a user must perform a touch input, and thus, as described above, a movement of the device may occur causing an input error.

In one embodiment of the invention, an electronic device is disclosed, including: a foldable display that is at least partially foldable, at least one processor, and at least one memory, storing one or more instructions that, when executed, cause the processor to: when the foldable display is changed from an unfolded state to a partially folded state, sett a first region of the foldable display to accept touch inputs, and set a second region of the foldable display to accept non-touch inputs.

In one embodiment of the invention, a method in an electronic device is disclosed, including: detecting, by at least one processor, that a foldable display of the electronic device changes from an unfolded state to a partially folded state, configuring a first region of the foldable display to accept touch inputs in the partially folded state, and configuring a second region of the foldable display to accept non-touch inputs in the partially folded state.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
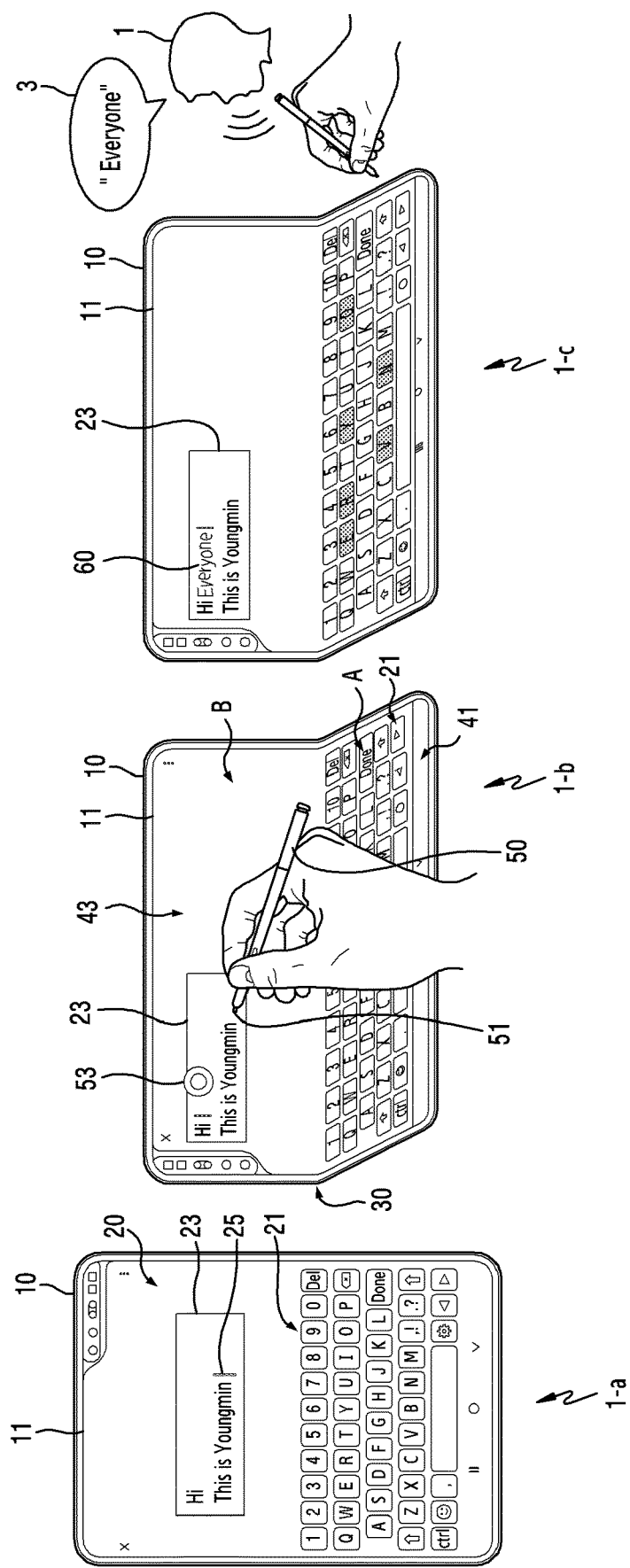
FIG. 1 illustrates a situation in which an electronic device according to an embodiment differently configures an external input method depending on a change in the state of the electronic device.

Hereinafter, certain embodiments will be described with reference to the accompanying drawings. Although this document has specific embodiments illustrated in the drawings and described in detail with reference thereto, the same is not for the purpose of limiting certain embodiments to specific forms. For example, it would be obvious to a person skilled in the art to which the disclosure pertains that certain embodiments can be variously modified.

FIG. 1 illustrates a situation in which an electronic device according to an embodiment differently configures an external input method, depending on a change in the state of the electronic device.

Referring to FIG. 1, an electronic device 10 may be implemented as one of various types of devices. For example, the electronic device may be implemented as a portable communication device (e.g. a smart phone), a computer device, a portable multimedia device, a portable medical device, a camera, a wearable device, or home appliances. The electronic device according to an embodiment is not limited to the above-described devices.

According to an embodiment, a display 11 provided in the electronic device 10 may be a foldable display, which is at least partially folded or unfolded. Further, the display 11 may be a touch sensitive display which can detect touch inputs and/or hovering inputs. In order to allow the display 11 to be folded or unfolded (either fully and/or partially), the electronic device 10 may include: a first housing structure including one region of the display 11, a second housing structure including the other region of the display 11, and a hinge structure which allows the first housing structure and the second housing structure to rotate about a folding axis.

According to an embodiment, the electronic device 10 may be disposed in a first state in which the display 11 is "fully" unfolded at an angle at or close to 180 degrees, and/or may be disposed in a second state in which the first housing structure and the second housing structure are arranged at an angle less than 180 degrees (e.g. an angle of 90 to 150 degrees). When disposed at the angle less than 180 degrees, the display 11 may be considered to be partially folded. The electronic device 10 may identify the first state and the second state according to a sensing value acquired by at least one sensor (e.g. a gyro sensor, a distance sensor, an angle sensor, etc.) included in the electronic device 10. The structure of the electronic device 10 will be described in detail with reference to FIGS. 2 to 4.

According to an embodiment, the electronic device 10 may execute various applications. The applications may include various application programs which are executed in an operating system. For example, the applications may include various types of applications, such as a document writing application, an image editing application, an image reproduction application, a video reproduction application, a phone call application, a text application, a navigation application, a music application, a system configuration application, a web browser application, an SNS application, and a camera application. The electronic device 10 may download data from an external device (e.g. an external server) to install an application. Alternatively, the electronic device 10 may include an application which has been installed while being manufactured by a manufacturer of the electronic device 10.

Referring to reference number 1-a of FIG. 1, in the first state in which the display 11 is unfolded, the electronic device 10 may execute a document writing application 20 and may display the executed document writing application 20 on the display 11.

According to an embodiment, in the first state, the electronic device 10 may display, on the display 11, a keyboard object 21 including multiple text input objects capable of inputting a text and a display region 23 in which an input text is displayed. In response to an input of touching the text input objects, the electronic device 10 may display the result of the input in the display region 23. Further, the electronic device 10 may change the position of a cursor 25 in response to an external input of touching one region of the display region 23. According to certain embodiments, the electronic device 10 may recognize and receive, as a text, a shape which is drawn in the display region 23 by a user's touch-and-drag input. A user input or external input may include, for example, a touch input or a hovering input, using a portion of a user's body, and a touch input or a hovering input, using a stylus pen.

Referring to reference number 1-b of FIG. 1, the state of the electronic device 10 may change from the first state in which the display 11 is unfolded to the second state in which the display 11 is partially folded.

According to an embodiment, the electronic device 10 may divide the display 11 into a region A and a region B with reference to the axis (e.g., a folding axis) 30 about which the display 11 is folded. The electronic device 10 may identify, as a first region 41, a region (e.g. the region A) which is positioned at a height identical or similar to that of the folding axis among the region A and the region B of the display 11. That is, the region 41 presently serving as a base of the electronic device is set as "region A" for the purposes of configuring the input method, based on position relative to the hinge and detection of the vertical axis, which orients the electronic device relative the ground.

For example, the electronic device 10 may select one of region 41 and region 43 to be the region A, which is positioned at a height identical or similar to that of the folding axis 30 among the region A and the region B, by using at least one sensor (e.g. an acceleration sensor, a distance measurement sensor, or a gyro sensor) included in the electronic device 10, and may identify the region A as the first region 41 based on its position relative to the hinge 30 and the surface on which the electronic device 10 is disposed. The electronic device 10 may determine the relative angle between the region A and the region B by at least one sensor positioned in each of the region A and the region B simultaneously when or after identifying the region A as the first region 41. When it is determined that the relative angle between the region A and the region B of the display 11 is included in a predetermined range (e.g. 90 to 150 degrees), the electronic device 10 may identify the region B as the second region 43.

Alternatively or additionally, the electronic device 10 may acquire an absolute angle between the regions A and B of the display 11 and a horizontal plane by using at least one sensor. In this case, the electronic device 10 may identify a region parallel to the horizontal plane as the first region 41, and may identify the remaining region as a second region 43.

A method for identifying the first region 41 and the second region 43 by the electronic device 10 is not limited thereto. For example, the electronic device 10 may have predetermined the first region 41 and the second region 43 in the display 11. Alternatively, the electronic device 10 may have predetermined the first region 41 and the second region 43 in the display 11 for each application.

According to an embodiment, the electronic device 10 may identify the display 11 as the first region 41 and the second region 43, and then may distinguish between (may differently configure) external inputs (user inputs) which can be acquired by the first region 41 and the second region 43. For example, the electronic device 10 may be configured to: acquire a touch input in the first region 41; and acquire a hovering input in the second region 43. In this case, the electronic device 10 may control the display 11 (or a display driver (not shown)) such that a touch input is not acquired in the second region 43.

According to an embodiment, the electronic device 10 may display a keyboard object 21 in the first region 41, and may display a display region 23 in the second region 43. In response to an input of touching at least one of multiple text input objects which is included in the keyboard object 21 displayed in the first region 41, the electronic device 10 may display a text, corresponding to the touched text input object, in the display region 23 displayed in the second region 43.

According to an embodiment, the electronic device 10 may acquire a hovering input by using the second region 43. For example, the electronic device 10 may display an object 53 indicating a hovering position in one region of the display 11, which is most adjacent to one end 51 of a stylus pen 50. The object 53 indicating a hovering position, for example, may be changed into and displayed in the form of a cursor after a predetermined time elapses.

According to certain embodiments, the stylus pen 50 and the electronic device 10 may establish communication therebetween by using a short-range communication (e.g. Bluetooth communication). In this case, in response to receiving a signal generated by an input of pressing a physical key provided on the stylus pen 50, the electronic device 10 may change the object 53 indicating a hovering position into the form of a cursor and display the same.

Referring to reference number 1-*c* of FIG. 1, the electronic device 10 may acquire and recognize a user's voice, may convert the voice into a text, and may display the text in the display region 23. In this case, the electronic device 10 may convert the input voice into a text, and may display the text at a point where a cursor or the object 53 indicating a hovering position and is positioned.

According to certain embodiments, the stylus pen 50 may include a microphone (not shown). The stylus pen 50 may acquire the user's voice via the microphone and may transmit the acquired voice to the electronic device 10. The electronic device 10 may recognize the acquired voice, may convert the recognized voice into a text, and may display the text at a point where a cursor or the object 53 indicating a hovering position is positioned.

For example, the stylus pen 50 may acquire a voice 3 of user 1 saying "Everyone". The stylus pen 50 may transmit the acquired voice to the electronic device 10. The electronic device 10 may recognize the acquired voice, may convert the acquired voice into a text, and then may display the text, "Everyone" 60, at a point of the second region 43, where a cursor or the object 53 indicating a hovering position has been displayed. According to an embodiment, the voice 3 of the user 1 may be acquired by the electronic device 10.

According to certain embodiments, when displaying an input voice in the form of a text, the electronic device 10 may display a text input object corresponding to the text so as to be distinguished from the remaining text input objects.

For example, while or after displaying the input text, "Everyone", in the display region 23 of the second region 43 of the display 11, the electronic device 10 may sequentially display text input objects, corresponding to "E", "V", "E", "R", "Y", "O", "N", and "E", to be distinguishable from the remaining text input objects. A method for distinguishing one text input object from the remaining text input objects may include, for example, distinguishably displaying at least one of the color, brightness, or chroma of at least a partial region of the text input object, but is not limited thereto.

As described above, according to certain embodiments, the electronic device 10 may differently configure, based on the state of the electronic device 10, an external input which can be acquired by each region of the display 11. Thus, in the situation in which the electronic device 10 is in the second state, the electronic device 10 may reduce vibration of the electronic device 10 due to a touch input to the second region 43.

Figure 2:
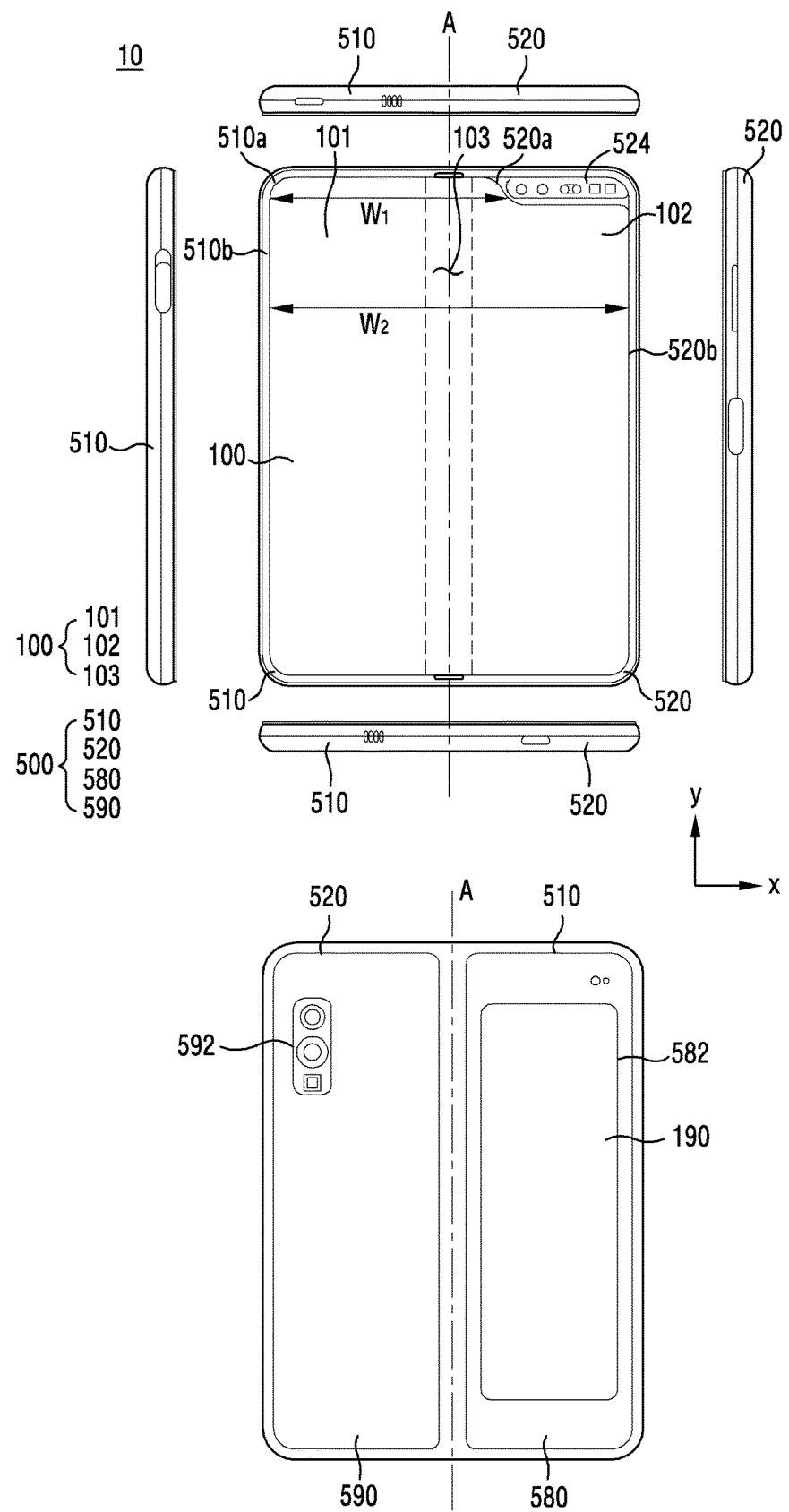
FIG. 2 illustrates an unfolded state of an electronic device according to an embodiment.
Figure 3:
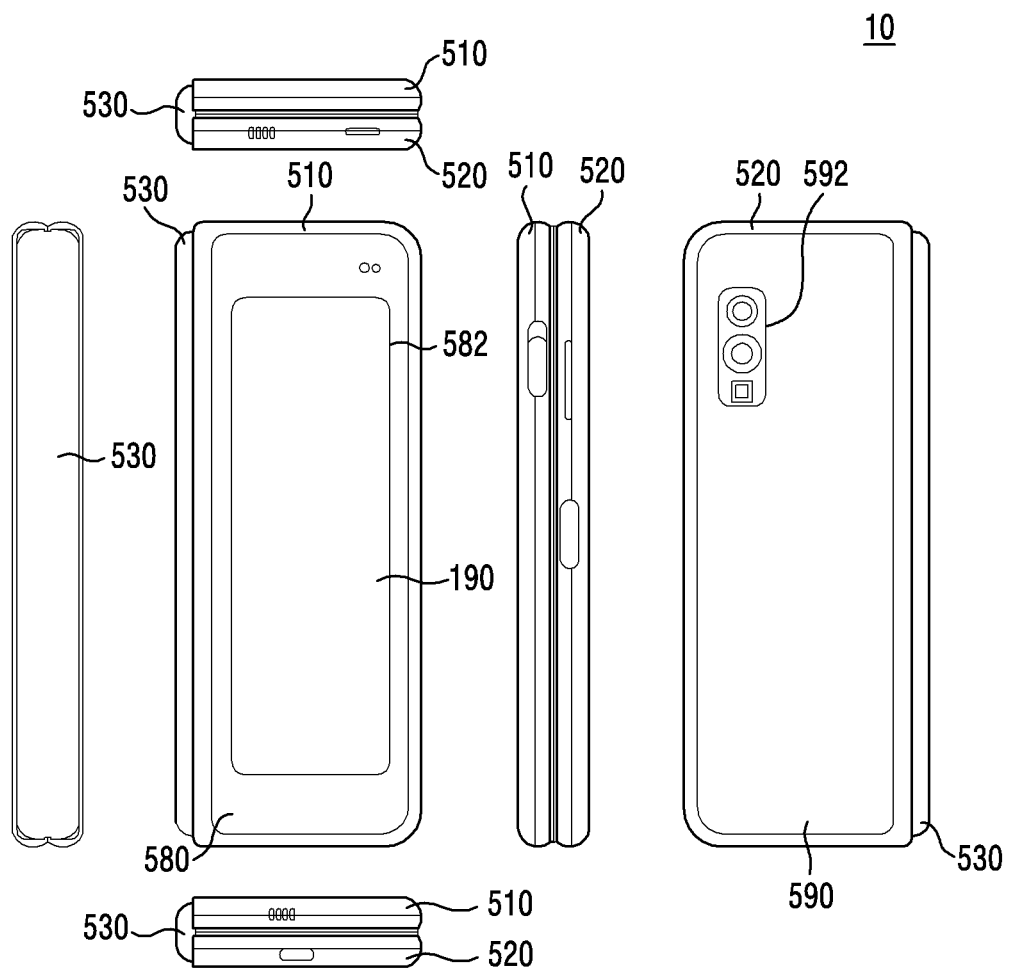
FIG. 3 illustrates a folded state of an electronic device according to an embodiment.

FIG. 2 illustrates a view of a "flat" state of an electronic device according to an embodiment. FIG. 3 illustrates a view of a folded state of the electronic device according to an embodiment.

Referring to FIGS. 2 and 3, in an embodiment, the electronic device 10 may include a foldable housing 500, a hinge cover 530 that covers a foldable portion of the foldable housing 500, and a flexible or foldable display 100 (hereinafter, abbreviated to the "display 100") that is disposed in a space formed by the foldable housing 500. The display 100 may include the display 11 of FIG. 1. In this disclosure, a surface on which the display 100 is disposed may be defined as a first surface or a front surface of the electronic device 10. A surface opposite to the front surface may be defined as a second surface or a rear surface of the electronic device 10. A surface that surrounds a space between the front surface and the rear surface may be defined as a third surface or a side surface of the electronic device 10.

In an embodiment, the foldable housing 500 may include a first housing structure 510, a second housing structure 520 including a sensor area 524, a first back cover 580, and a second back cover 590. The foldable housing 500 of the electronic device 10 is not limited to the form and the coupling illustrated in FIGS. 2 and 3 and may be implemented by a combination and/or a coupling of other shapes or parts. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis (an axis A) and may have substantially symmetrical shapes with respect to the folding axis A. As will be described below, the angle or distance between the first housing structure 510 and the second housing structure 520 may vary depending on whether the electronic device 10 is in a flat, folded, or intermediate state. In the illustrated embodiment, unlike the first housing structure 510, the second housing structure 520 may additionally include the sensor area 524 in which various sensors are arranged, but may have a symmetrical shape in the other area.

In an embodiment, as illustrated in FIG. 2, the first housing structure 510 and the second housing structure 520 may form a recess together in which the display 100 is received. In the illustrated embodiment, due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed on the periphery of the sensor area 524 and (2) a second width w2 formed by a second portion 510b of the first housing structure 510 and a second portion 520b of the second housing structure 520 that does not correspond to the sensor area 524 and that is parallel to the folding axis A. In this case, the second width w2 may be formed to be longer than the first width w1.

In other words, the first portion 510a of the first housing structure 510 and the first portion 520a of the second housing structure 520 that have asymmetrical shapes may form the first width w1 of the recess, and the second portion 510b of the first housing structure 510 and the second portion 520b of the second housing structure 520 that have symmetrical shapes may form the second width w2 of the recess. In an embodiment, the first portion 520a and the second portion 520b of the second housing structure 520 may have different distances from the folding axis A. The widths of the recess are not limited to the illustrated examples. In certain embodiments, the recess may have a plurality of widths by the form of the sensor area 524 or by the portions of the first housing structure 510 and the second housing structure 520 that have asymmetrical shapes.

In an embodiment, at least a part of the first housing structure 510 and the second housing structure 520 may be formed of metal or non-metal having strength selected to support the display 100.

In an embodiment, the sensor area 524 may be formed to have a predetermined area adjacent to one corner of the second housing structure 520. However, the arrangement, shape, and size of the sensor area 524 are not limited to the illustrated example. For example, in another embodiment, the sensor area 524 may be provided in another corner of the second housing structure 520 or in any area between an upper corner and a lower corner of the second housing structure 520. In an embodiment, parts embedded in the electronic device 10 to perform various functions may be exposed on the front surface of the electronic device 10 though the sensor area 524 or through one or more openings formed in the sensor area 524. In certain embodiments, the parts may include various types of sensors. The sensors may include, for example, at least one of a front camera, a receiver, or a proximity sensor.

The first back cover 580 may be disposed on one side of the folding axis A on the rear surface of the electronic device 10 and may have, for example, a substantially rectangular periphery that is surrounded by the first housing structure 510. Similarly, the second back cover 590 may be disposed on an opposite side of the folding axis A on the rear surface of the electronic device 10 and may have a periphery surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have symmetrical shapes, and in another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various parts (e.g., a printed circuit board or a battery) of the electronic device 10 are disposed. In an embodiment, one or more parts may be disposed or visually exposed on the rear surface of the electronic device 10. For example, at least part of a sub-display 190 may be visually exposed through a first rear area 582 of the first back cover 580. In another embodiment, one or more parts or sensors may be visually exposed through a second rear area 592 of the second back cover 590. In certain embodiments, the sensors may include a proximity sensor and/or a rear camera.

Referring to FIG. 3, the hinge cover 530 may be disposed between the first housing structure 510 and the second housing structure 520 to hide internal parts (e.g., hinge structures). In an embodiment, the hinge cover 530 may be hidden by part of the first housing structure 510 and part of the second housing structure 520, or may be exposed to the outside, depending on a state (e.g., a flat state or a folded state) of the electronic device 10.

For example, when the electronic device 10 is in a flat state as illustrated in FIG. 2, the hinge cover 530 may be hidden by the first housing structure 510 and the second housing structure 520 and thus may not be exposed. In another example, when the electronic device 10 is in a folded state (e.g., a fully folded state) as illustrated in FIG. 3, the hinge cover 530 may be exposed between the first housing structure 510 and the second housing structure 520 to the outside. In another example, when the electronic device 10 is in an intermediate state in which the first housing structure 510 and the second housing structure 520 are folded with a certain angle, the hinge cover 530 may be partially exposed between the first housing structure 510 and the second housing structure 520 to the outside. However, in this case, the exposed area may be smaller than that when the electronic device 10 is in a fully folded state. In an embodiment, the hinge cover 530 may include a curved surface.

The display 100 may be disposed in the space formed by the foldable housing 500. For example, the display 100 may be mounted in the recess formed by the foldable housing 500 and may form almost the entire front surface of the electronic device 10.

Accordingly, the front surface of the electronic device 10 may include the display 100, and a partial area of the first housing structure 510 and a partial area of the second housing structure 520 that are adjacent to the display 100. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 100 may refer to a display, at least a partial area of which is able to be transformed into a flat surface or a curved surface. In an embodiment, the display 100 may include a folding area 103, a first area 101 disposed on one side of the folding area 103 (on a left side of the folding area 103 illustrated in FIG. 2), and a second area 102 disposed on an opposite side of the folding area 103 (on a right side of the folding area 103 illustrated in FIG. 2). A first region 101 and a second region 102 may be understood to be different from the first region 41 and the second region 43 illustrated in FIG. 1, respectively.

The areas of the display 100 illustrated in FIG. 2 are illustrative, and the display 100 may be divided into a plurality of (e.g., four or more, or two) areas according to a structure or function of the display 100. For example, in the embodiment illustrated in FIG. 2, the areas of the display 100 may be divided from each other by the folding area 103 or the folding axis (the axis A) that extends in parallel to the y-axis. However, in another embodiment, the display 100 may be divided into areas with respect to another folding area (e.g., a folding area parallel to the x-axis) or another folding axis (e.g., a folding axis parallel to the x-axis).

The first area 101 and the second area 102 may have substantially symmetrical shapes with respect to the folding area 103. However, unlike the first area 101, the second area 102 may include a notch 104 that is cut according to the presence of the sensor area 524, but in the other area, the second area 102 may be symmetric to the first area 101. In other words, the first area 101 and the second area 102 may each include a portion having a symmetrical shape and a portion having an asymmetrical shape.

Hereinafter, operations of the first housing structure 510 and the second housing structure 520 and the areas of the display 100 according to states (e.g., a flat state and a folded state) of the electronic device 10 will be described.

In an embodiment, when the electronic device 10 is in a flat state (e.g., FIG. 2), the first housing structure 510 and the second housing structure 520 may be arranged to face the same direction while forming an angle of 180 degrees. The surface of the first area 101 of the display 100 and the surface of the second area 102 thereof may face the same direction (e.g., face away from the front surface of the electronic device 10) while forming an angle of 180 degrees. The folding area 103 may form the same plane together with the first area 101 and the second area 102.

In an embodiment, when the electronic device 10 is in a folded state (e.g., FIG. 3), the first housing structure 510 and the second housing structure 520 may be arranged to face each other. The surface of the first area 101 of the display 100 and the surface of the second area 102 thereof may face each other while forming a narrow angle (e.g., an angle between 0 degrees and 10 degrees). At least part of the folding area 103 may form a curved surface having a predetermined curvature.

In an embodiment, when the electronic device 10 is in an intermediate state (e.g., FIG. 3), the first housing structure 510 and the second housing structure 520 may be arranged to have a certain angle therebetween. The surface of the first area 101 of the display 100 and the surface of the second area 102 thereof may form an angle that is greater than that in the folded state and is smaller than that in the flat state. At least part of the folding area 103 may form a curved surface having a predetermined curvature, and the curvature may be smaller than that in the folded state.

Figure 4:
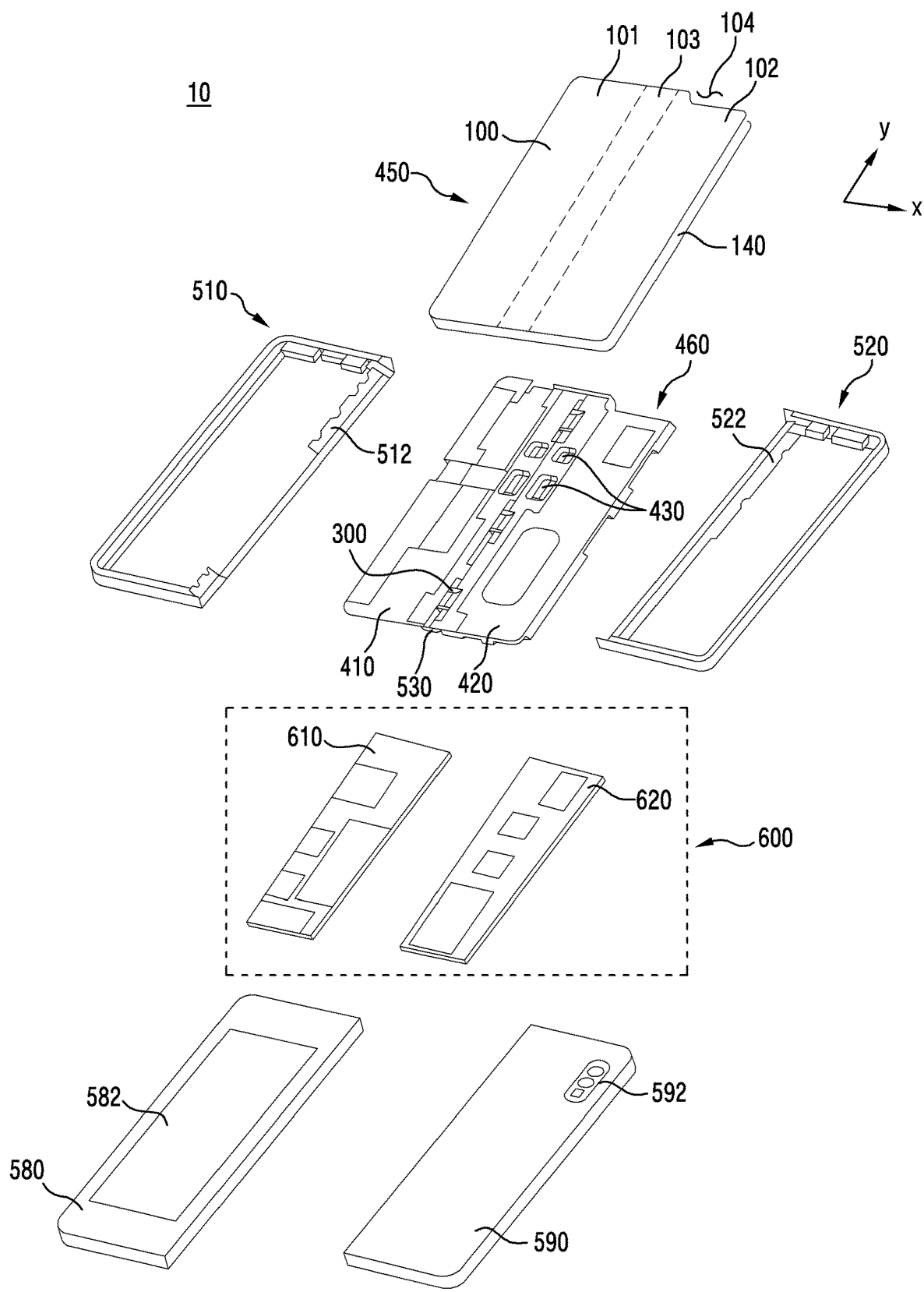
FIG. 4 is an exploded perspective of an electronic device according to an embodiment.

FIG. 4 illustrates an exploded perspective view of the electronic device according to an embodiment.

Referring to FIG. 4, in an embodiment, the electronic device 10 may include a display unit 450, a bracket assembly 460, a substrate 600, the first housing structure 510, the second housing structure 520, the first back cover 580, and the second back cover 590. In this disclosure, the display unit 450 may be referred to as the display module or the display assembly.

The display unit 450 may include the display 100 and at least one plate or layer 140 on which the display 100 is mounted. In an embodiment, the plate 140 may be disposed between the display 100 and the bracket assembly 460. The display 100 may be disposed on at least part of one surface (e.g., an upper surface with respect to FIG. 4) of the plate 140. The plate 140 may be formed in a shape corresponding to the display 100. For example, a partial area of the plate 140 may be formed in a shape corresponding to the notch 104 of the display 100.

The bracket assembly 460 may include a first bracket 410, a second bracket 420, hinge structures 300 disposed between the first bracket 410 and the second bracket 420, the hinge cover 530 that covers the hinge structures 300 when viewed from the outside, and a wiring member 430 (e.g., a flexible printed circuit (FPC)) that traverses the first bracket 410 and the second bracket 420.

In an embodiment, the bracket assembly 460 may be disposed between the plate 140 and the substrate 600. For example, the first bracket 410 may be disposed between the first area 101 of the display 100 and a first substrate 610. The second bracket 420 may be disposed between the second area 102 of the display 100 and a second substrate 620.

In an embodiment, at least a part of the wiring member 430 and the hinge structure may be disposed inside the bracket assembly 460. The wiring member 430 may be arranged in a direction (e.g., the x-axis direction) across the first bracket 410 and the second bracket 420. The wiring member 430 may be arranged in a direction (e.g., the x-axis direction) that is perpendicular to a folding axis (e.g., the y-axis or the folding axis A of FIG. 2) of the folding area 103 of the electronic device 10.

As mentioned above, the substrate 600 may include the first substrate 610 disposed at the first bracket 410 side and the second substrate 620 disposed at the second bracket 420 side. The first substrate 610 and the second substrate 620 may be disposed in a space that is formed by the bracket assembly 460, the first housing structure 510, the second housing structure 520, the first back cover 580, and the second back cover 590. Parts for implementing various functions of the electronic device 10 may be mounted on the first substrate 610 and the second substrate 620.

The first housing structure 510 and the second housing structure 520 may be assembled so as to be coupled to opposite sides of the bracket assembly 460 in the state in which the display unit 450 is coupled to the bracket assembly 460. As will be described herein, the first housing structure 510 and the second housing structure 520 may slide on the opposite sides of the bracket assembly 460 and may be coupled with the bracket assembly 460.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces that correspond to curved surfaces included in the hinge cover 530.

In an embodiment, when the electronic device 10 is in a flat state (e.g., FIG. 2), the first rotation support surface 512 and the second rotation support surface 522 may cover the hinge cover 530 such that the hinge cover 530 is not exposed, or is exposed to a minimum, on the rear surface of the electronic device 10. Meanwhile, when the electronic device 10 is in a folded state (e.g., FIG. 3), the first rotation support surface 512 and the second rotation support surface 522 may rotate along the curved surfaces included in the hinge cover 530, such that the hinge cover 530 is exposed on the rear surface of the electronic device 10 to the maximum.

Figure 5:
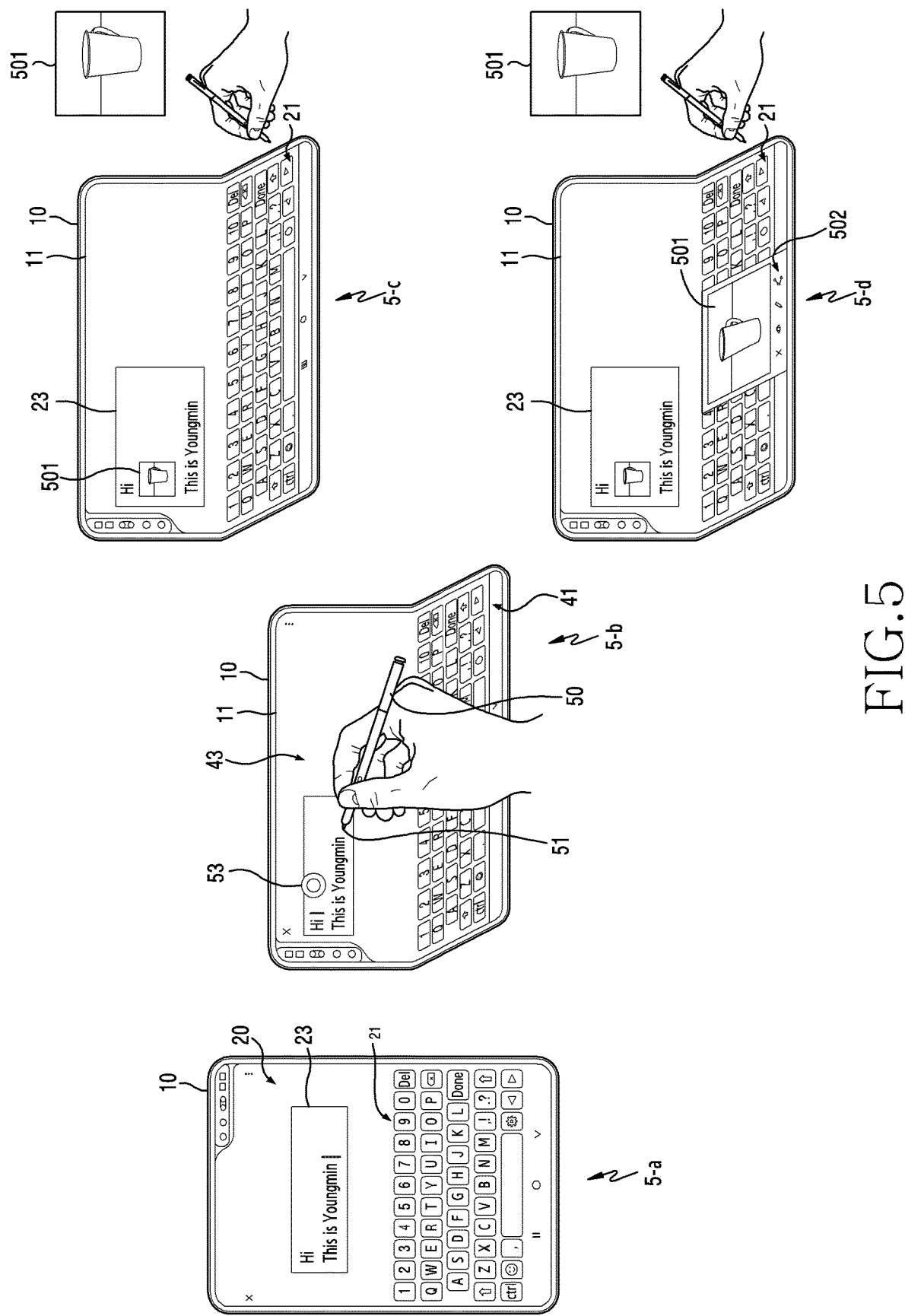
FIG. 5 illustrates another situation in which an electronic device according to an embodiment differently configures an external input depending on a change in the state of the electronic device.

FIG. 5 illustrates another situation in which an electronic device according to an embodiment differently configures an external input, depending on a change in the state of the electronic device.

Referring to reference number 5-*a* of FIG. 5, in a first state in which the display 11 is unfolded (e.g., substantially flat), the electronic device 10 may execute a messaging application 20 and may display the executed messaging application 20 on the display 11.

According to an embodiment, in the first state, the electronic device 10 may display, on the display 11, a keyboard 21, including multiple keys selectable to input text, and the display region 23 in which an input text is displayed (e.g., in an input field). In response to detecting inputs to the keyboard, the electronic device 10 may display the corresponding entered text in the display region 23.

Referring to reference number 5-b of FIG. 5, the state of the electronic device 10 may change from the first state in which the display 11 is unfolded to a second state in which the display 11 is partially folded.

According to an embodiment, in response to changing to the second state, the electronic device 10 may configure the display 11 to include the first region 41 and the second region 43. The first and second regions 41 and 43 may be differently configured with respect to external inputs (or user inputs) received by the first region 41 and the second region 43, respectively. For example, the electronic device 10 may be configured to acquire a touch input in the first region 41, and acquire a hovering input in the second region 43. This configuration may be partly or fully exclusive such that the first region 41 ignores hovering inputs, and/or the second region 43 ignores touch inputs.

According to an embodiment, when a hovering input is sensed in the second region 43, the electronic device 10 may display the object 53 indicating a position of the hovering input in one region of the display 11, positioned adjacent to a terminal end 51 of the stylus pen 50. The object 53 indicating the hovering position, for example, may be visually changed into a cursor after a predetermined time elapses.

According to certain embodiments, the stylus pen 50 and the electronic device 10 may establish communication therebetween by using a short-range communication (e.g. Bluetooth communication). In this case, in response to receiving a signal generated by an input of pressing a physical key provided on the stylus pen 50, the electronic device 10 may change the object 53 indicating a hovering position into the form of a cursor.

Referring to reference number 5-c of FIG. 5, the electronic device 10 may acquire an image 501 and may display the acquired image 501 in the display region 23 of the display 11. In this case, the electronic device 10 may display the acquired image at a point where a cursor or the object 53 indicating a hovering position is positioned.

According to an embodiment, the electronic device 10 may acquire an image by using a camera (not shown) included therein. For example, the electronic device 10 may capture an image 501 using a camera, by selection of a physical button included in the electronic device 10, command via a user's voice, or some input by the stylus pen 50. The electronic device 10 may display the acquired image 501 at the position where a cursor or the object 53 indicating a hovering position is positioned.

According to certain embodiments, the stylus pen 50 may include a camera (not shown). A user may capture the image 501 using a camera included in the stylus pen 50. The stylus pen 50 may transmit the captured image 501 to the electronic device 10. The electronic device 10 may display the acquired image 501 at a position where a cursor or the object 53 is located, indicating a hovering of the stylus.

According to certain embodiments, as illustrated in reference number 5-d, the electronic device 10 may display the acquired image 501 in the first region 41 of the display 11. For example, the electronic device 10 may display the acquired image 501 while the image 501 overlaps the keyboard object 21. In this case, the electronic device 10 may display an object 502 capable of editing an image together with the image 501. According to certain embodiments, the electronic device 10 may display the acquired image 501 and the object 502 capable of editing an image for a preconfigured time (e.g. 5 to 7 seconds) and may finish the displaying.

Figure 6:
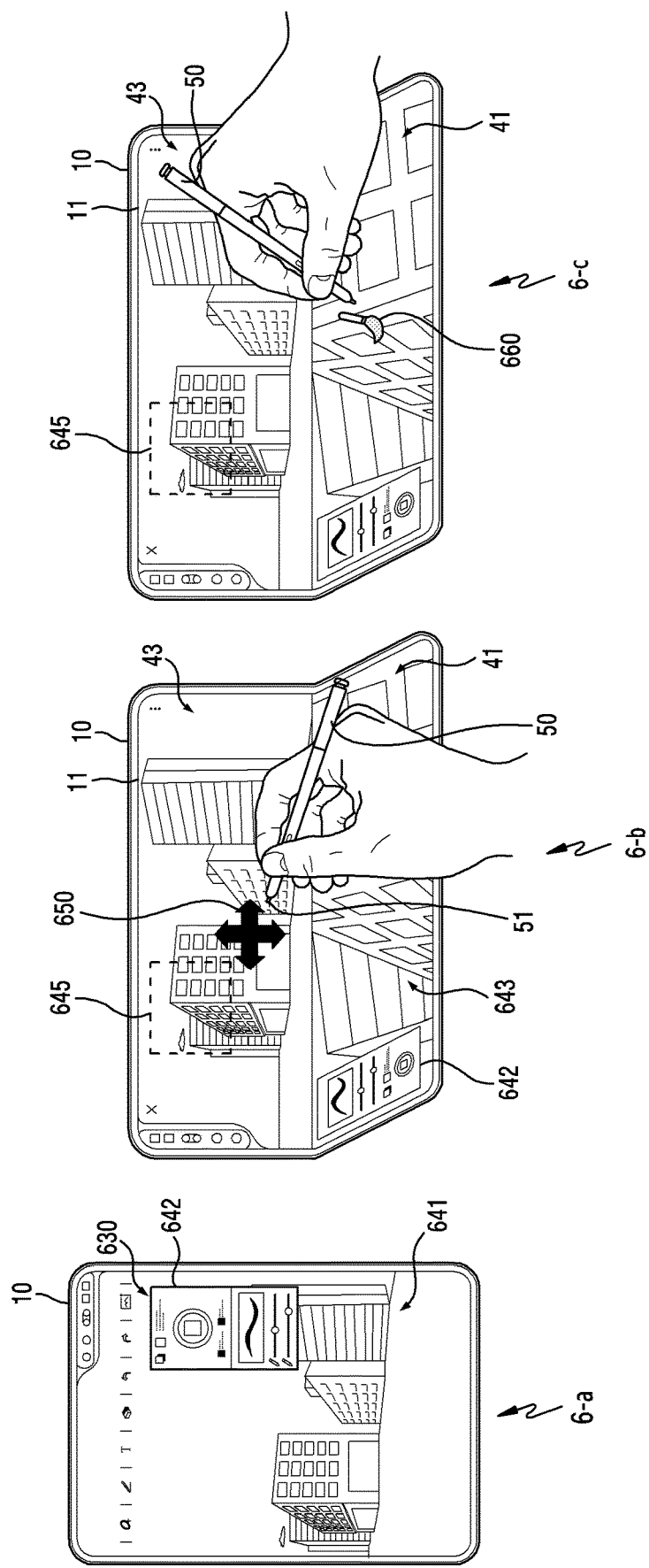
FIG. 6 illustrates a situation in which, when editing an image, an electronic device according to an embodiment differently configures an external input depending on a change in the state of the electronic device.

FIG. 6 illustrates a situation in which, when editing an image, an electronic device according to an embodiment differently configures an external input depending on a change in the state of the electronic device.

Referring to reference number 6-a of FIG. 6, in a first state in which the display 11 is unfolded, the electronic device 10 may execute an image editing application 630, and may display the executed image editing application 630 on the display 11.

According to an embodiment, in the first state, the electronic device 10 may display, on the display 11, an image 641 to be edited, and an image editing tool object 642 selectable to execute at least one image-editing function. The electronic device 10 may edit the image 641, based on a user input designating one region of the image 641, and activating a function included in the image editing tool object 642. For example, the electronic device 10 may move, magnify, or reduce the image 641 displayed on the display 11, based on various touch inputs (e.g. touch and drag, hovering, pinch-out, or pinch-in) to the image 641. However, image editing is not limited thereto.

Referring to reference number 6-b of FIG. 6, the state of the electronic device 10 may change from the first state in which the display 11 is unfolded to a second state in which the display 11 is partially folded.

According to an embodiment, in response to changing to the second state, the electronic device 10 may identify the display 11 as the first region 41, and the second region 43. The first and second regions 41 and 43 may be differently configured with respect to external inputs (or user inputs) received by the first region 41 and the second region 43, respectively. For example, the electronic device 10 may be configured to acquire a touch input in the first region 41, and acquire a hovering input in the second region 43 (e.g., either partly and wholly exclusively of the other type of input, as described earlier).

According to an embodiment, the electronic device 10 may display the entirety of the image 641 in the second region 43. The electronic device 10 may display a partial region 643 of the image 641 in the first region 41. The electronic device 10 may display the image editing tool object 642 in the first region 41.

According to an embodiment, in order to indicate a position corresponding to the partial region 643 of the image 641 (e.g., a zoomed-in portion) displayed in the first region 41, the electronic device 10 may display a navigation object 645 indicating a region displayed in the first region 41, which corresponds to a portion of the image 641 displayed in the second region 43. That is, the electronic device 10 may display, in the first region 41, the partial region 643 corresponding to the navigation object 645.

According to an embodiment, when a hovering input is sensed in the second region 43, the electronic device 10 in the second state may display an object indicating a hovering position in one region of the display 11, which is disposed adjacent to a terminal end 51 of the stylus pen 50. The object indicating a hovering position, for example, may be changed into an object 650 indicating the movability of the navigation object 645 after a predetermined time elapses.

According to certain embodiments, the stylus pen 50 and the electronic device 10 may establish communication therebetween by using a short-range communication (e.g. Bluetooth communication). In this case, in response to receiving a signal generated by an input of pressing a physical key provided on the stylus pen 50, the electronic device 10 may change the object indicating a hovering position into the form of the object 650 indicating the movability of the navigation object 645.

The electronic device 10 may move the navigation object 645 in response to the movement of the stylus pen 50. In this case, in response to the movement of the navigation object 645, the electronic device 10 may change and display the partial region 643 displayed in the first region 41.

That is, a user may select, using the navigation object 645, a region to be edited from among the entirety of the image 641 displayed in the second region 43, and may edit the partial region 643 of the image 641, which is displayed in the first region 41 and corresponds to a region in which the navigation object 645 is positioned, by using the image editing tool object 642.

According to certain embodiments, the electronic device 10 may adjust the size of the navigation object 645 in response to a user input. Thus, the user may adjust the size of the partial region 643 of the image 641, which is displayed in the first region 41.

Referring to reference number 6-*c* of FIG. 6, the electronic device 10 in the second state may receive a hovering input in the first region 41. For example, a user may adjust the position of the navigation object 645 in the second region 43 using the stylus pen 50, and position the stylus pen 50 adjacent to the first region 41.

When a hovering input is sensed in the first region 41, the electronic device 10 may display an icon representing a preconfigured function in the region in which the hovering input is detected. For example, the electronic device 10 may display an object 660, selectable to input a color where the hovering input is sensed. The electronic device 10 may add a color to the region in which the hovering input is sensed, based detecting a user input requesting input of the color. However, the hovering input in the first region 41 is not limited to the above-described function. For example, when a hovering input is sensed in the first region 41, the electronic device 10 in the second state may display an object corresponding to a most recently used image-editing function in a region in which the hovering input is sensed.

Figure 7:
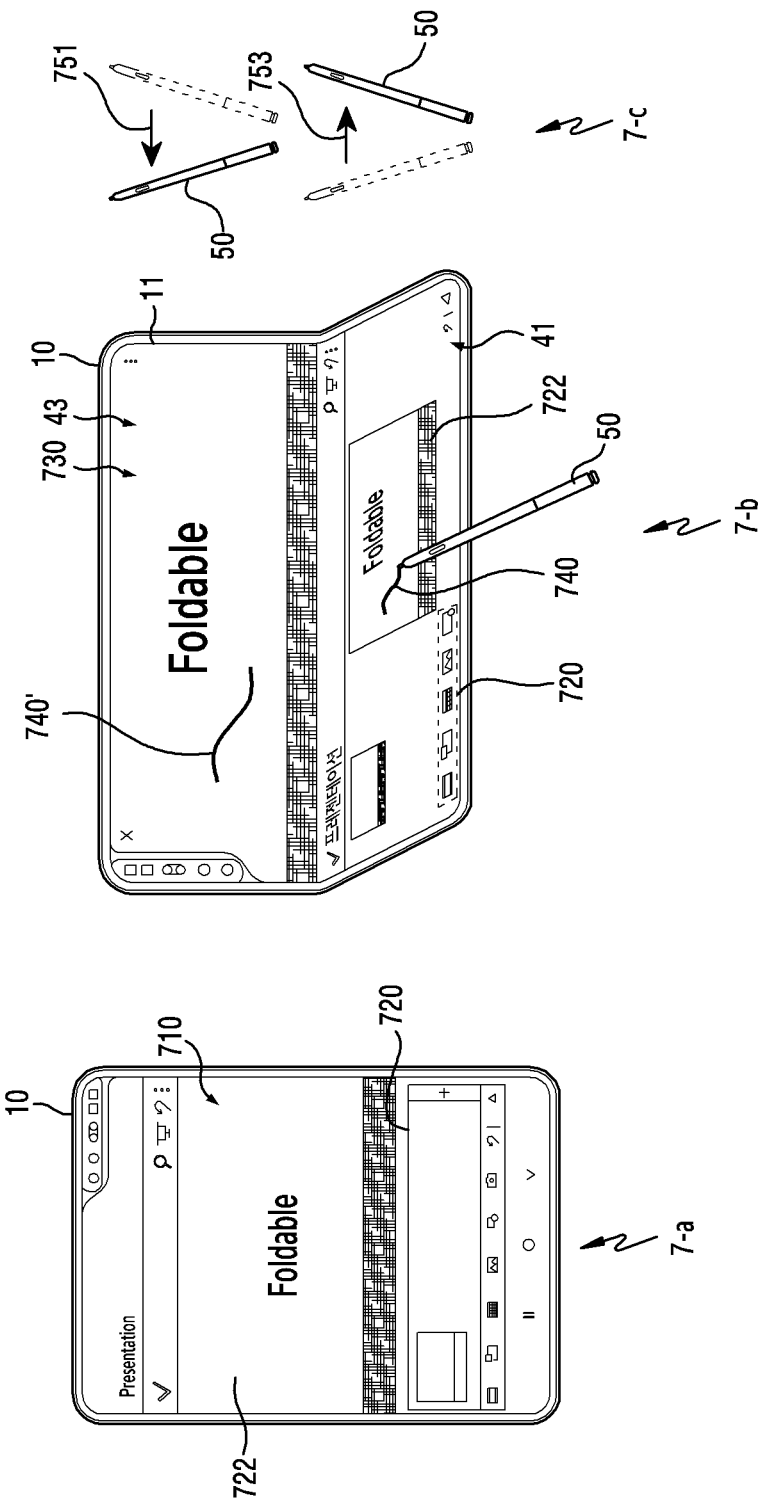
FIG. 7 illustrates a situation in which, when executing a presentation application, an electronic device according to an embodiment differently configures an external input depending on a change in the state of the electronic device.

FIG. 7 illustrates a situation in which, when executing a presentation application, an electronic device according to an embodiment differently configures an external input depending on a change in the state of the electronic device.

Referring to reference number 7-*a* of FIG. 7, in a first state in which the display 11 is unfolded, the electronic device 10 may execute a presentation application 710 and may display the executed presentation application 710 on the display 11.

According to an embodiment, in the first state, the electronic device 10 may display, on the display 11, an input tool object 720 capable of selecting and inputting various objects for presentation and a display region 722 in which the input objects are displayed. On the basis of a user input of selecting object by using the input tool object 720, the electronic device 10 may display the result of the input in the display region 722. According to certain embodiments, the electronic device 10 in the first state may execute a preconfigured function in response to a touch input or hovering input performed in the display region 722. For example, on the basis of a touch-and-drag input performed in the display region 722, the electronic device 10 may generate a line or may recognize and display a text Referring to reference number 7-*b* of FIG. 7, the state of the electronic device 10 may change from the first state in which the display 11 is unfolded to a second state in which the display 11 is partially folded.

According to an embodiment, in response to changing to the second state, the electronic device 10 may identify the display 11 as the first region 41 and the second region 43. The first and second regions 41 and 43 may be differently configured with respect to external inputs (or user inputs) received by the first region 41 and the second region 43, respectively. For example, the electronic device 10 may be configured to acquire a touch input in the first region 41, and acquire a hovering input in the second region 43 (e.g., either partly and wholly exclusively of the other type of input, as described earlier).

According to an embodiment, the electronic device 10 may identify the display 11 as the first region 41 and the second region 43, and then may display, in the first region 41, the input tool object 720 capable of selecting and inputting various objects for presentation and the display region 722 in which the input objects are displayed. Further, the electronic device 10 may display, in the second region 43, an output screen 730 for reproducing the edited display region 722.

According to an embodiment, the electronic device 10 in the second state may update and display the output screen 730 displayed in the second region 43, based on a user's touch input for displaying various objects in the display region 722 by using the input tool object 720 displayed in the first region 41.

For example, the electronic device 10 may receive and display an input line 740 in the display region 722 which is displayed in the first region 41. The electronic device 10 may display the line 740, based on a touch-and-drag input of the stylus pen 50 or a user input using a function included in the input tool object 720.

In this case, the electronic device 10 may update the output screen 730 displayed in the second region 43 to include a line 740', based on the line 740 input and displayed in the first region 41, and may display the updated output screen 730. Thus, the user may predict a situation viewed in the output screen while editing a presentation program.

According to certain embodiments, the electronic device 10 may establish communication with an external electronic device in a wireless or wired manner. For example, when the electronic device 10 is connected to an external display device, the electronic device 10 may display the output screen 730, displayed in the electronic device 10, on the external display device according to a user's selection.

According to an embodiment, the electronic device 10 may acquire an input from an external device (e.g. the stylus pen 50) in the second region 43 to control the presentation application 710.

For example, the stylus pen 50 and the electronic device 10 may establish communication therebetween by using a short-range communication (e.g. Bluetooth communication). In this case, the electronic device 10 may acquire a signal according to the movement direction of the stylus pen 50 or a signal generated by an input of pressing a physical key provided on the stylus pen 50.

Referring to reference number 7-*c* of FIG. 7, the stylus pen 50 may include a sensor capable of measuring movement, such as a gyro sensor or an acceleration sensor. The stylus pen 50 may acquire a sensing value change corresponding to movement 751 from the right to the left, and may transmit the acquired sensing value change to the electronic device 10. The electronic device 10 may perform a preconfigured function, based on the acquired sensing value change. For example, the electronic device 10 may update the output screen 730 currently displayed in the second region 43 to display an output screen of an immediately previous page in the second region 43.

According to certain embodiments, the stylus pen 50 may acquire a sensing value change corresponding to movement 753 from the left to the right, and may transmit the acquired sensing value change to the electronic device 10. The electronic device 10 may perform a preconfigured function, based on the acquired sensing value change. For example, the electronic device 10 may update the output screen 730 currently displayed in the second region 43 to display an output screen of an immediately following page in the second region 43. However, functions, which the electronic device 10 performs based on a signal generated by the stylus pen 50, are not limited thereto.

Figure 8:
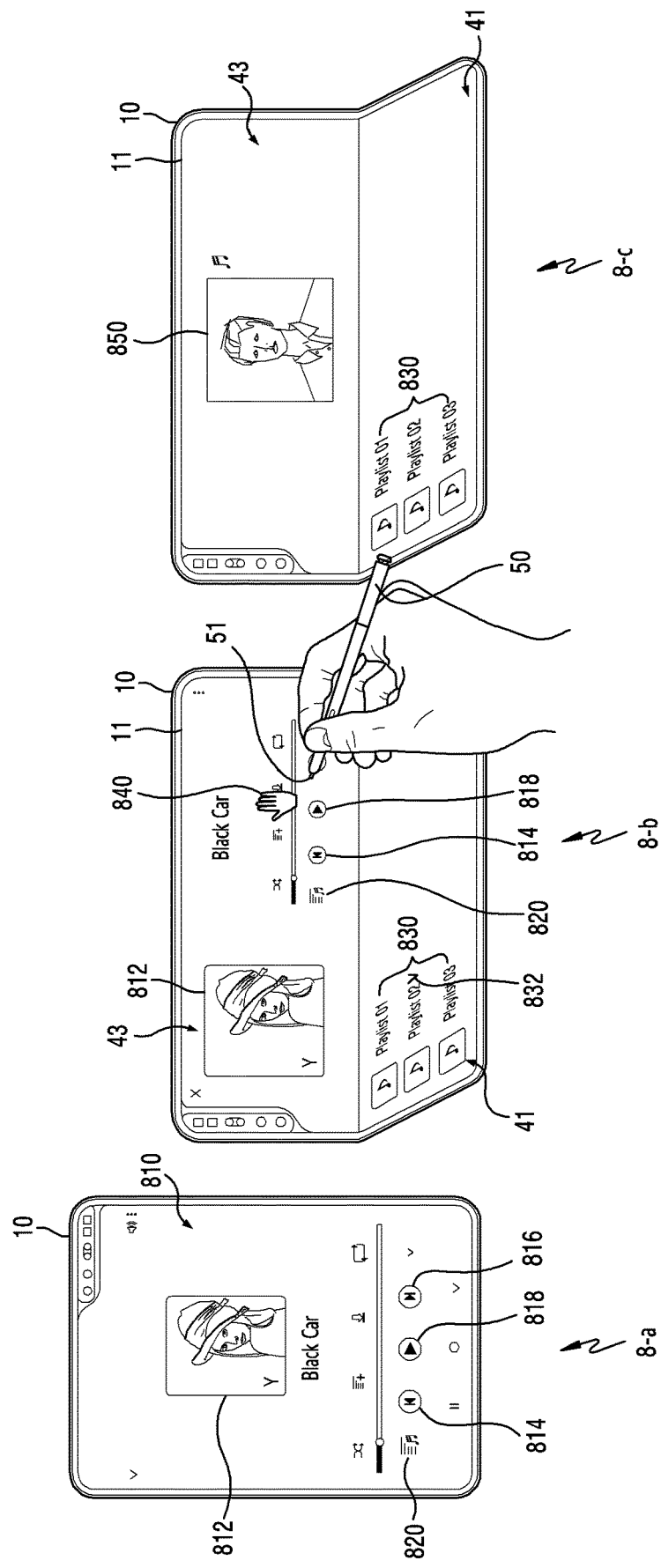
FIG. 8 illustrates a situation in which, when executing a music playback application, an electronic device according to an embodiment differently configures an external input depending on a change in the state of the electronic device.

FIG. 8 illustrates a situation in which, when executing a music playback application, an electronic device according to an embodiment differently configures receivable external inputs, depending on a change in the state of the electronic device.

Referring to reference number 8-a of FIG. 8, in a first state in which the display 11 is unfolded, the electronic device 10 may execute a music playback application 810 and may display the executed music playback application 810 on the display 11.

According to an embodiment, in the first state, the electronic device 10 may display, on the display 11, a representative image 812 of a music file being reproduced and one or more objects for controlling a music file being reproduced (e.g. a previous song listening object 814, a following song listening 816, a reproduction start object 818, a list display object 820, etc.). The electronic device 10 may perform a preconfigured function, based on a user input of selecting the objects for controlling a music being reproduced.

According to certain embodiments, the electronic device 10 may execute a preconfigured function in response to detecting a touch input or hovering input to the display 11. For example, the electronic device 10 may reproduce a previous song or a following song in response to a leftward/rightward moving touch-and-drag input or leftward/rightward moving hovering input, which is performed on the display 11.

Referring to reference number 8-b of FIG. 8, the electronic device 10 may change from the first state in which the display 11 is unfolded to a second state in which the display 11 is partially folded.

According to an embodiment, in response to changing to the second state, the electronic device 10 may identify the display 11 as the first region 41 and the second region 43. The first and second regions 41 and 43 may be differently configured with respect to external inputs (or user inputs) received by the first region 41 and the second region 43, respectively. For example, the electronic device 10 in the second state may be configured to acquire a touch input in the first region 41.

According to an embodiment, the electronic device 10 may identify the display 11 as the first region 41 and the second region 43, and then may display a music file list 830, which can be reproduced, in the first region 41. Further, the electronic device 10 may display, in the second region 43, the representative image 812 of a music file being reproduced and one or more objects for controlling a music file being reproduced (e.g. the previous song listening object 814, the following song listening object 816, the reproduction start object 818, the list display object 820, etc.). According to certain embodiments, the electronic device 10 may display a music file currently selected from the music file list 830 so as to be distinguished from the remaining music files. For example, the electronic device 10 may display a music file being reproduced while an icon 832 is added thereto, or may display a music file being reproduced by using a different color.

According to an embodiment, when the electronic device 10 in the second state acquires a touch input of selecting one music file from the music file list 830 displayed in the first region 41, the electronic device 10 may finish reproducing a music file being reproduced and may reproduce the selected music file.

According to an embodiment, the electronic device 10 in the second state may be configured to acquire a hovering input in the second region 43. For example, the electronic device 10 may display an object indicating a hovering position in one region of the display 11, which is most adjacent to one end 51 of the stylus pen 50. The object indicating a hovering position may be changed into and displayed in the form of an object 840 for selecting a song prior to or following a music being reproduced, for example, after a predetermined time elapses or in response to an input of pressing a button (not shown) included in the stylus pen 50.

The electronic device 10 may reproduce a song prior to or following a song being reproduced, in response to movement of the stylus pen 50.

According to an embodiment, the electronic device 10 may identically perform a function of the hovering input by using a touch-and-drag input performed in the second region 43. Alternatively, the electronic device 10 may also be configured such that the touch-and-drag input performs a function different from that of the hovering input.

Referring to reference number 8-c of FIG. 8, the electronic device 10 in the second state may acquire a touch input in the first region 41. For example, on the basis of a user input of touching one music file in the music file list 830, the electronic device 10 may display a representative image 850 of the selected music file in the second region 43, and may reproduce the selected music file. Alternatively, when a touch-and-drag input is sensed in the region in which the music file list 830 is displayed, the electronic device 10 may display a music file list which has not been displayed in the first region 41.

According to an embodiment, the electronic device 10 in the second state may identically perform the function of the touch input or the touch-and-drag input by using a hovering input performed in the first region 41. Alternatively, the electronic device 10 may also be configured such that the hovering input performs a function which is different from that of the touch input or the touch-and-drag input.

Figure 9:
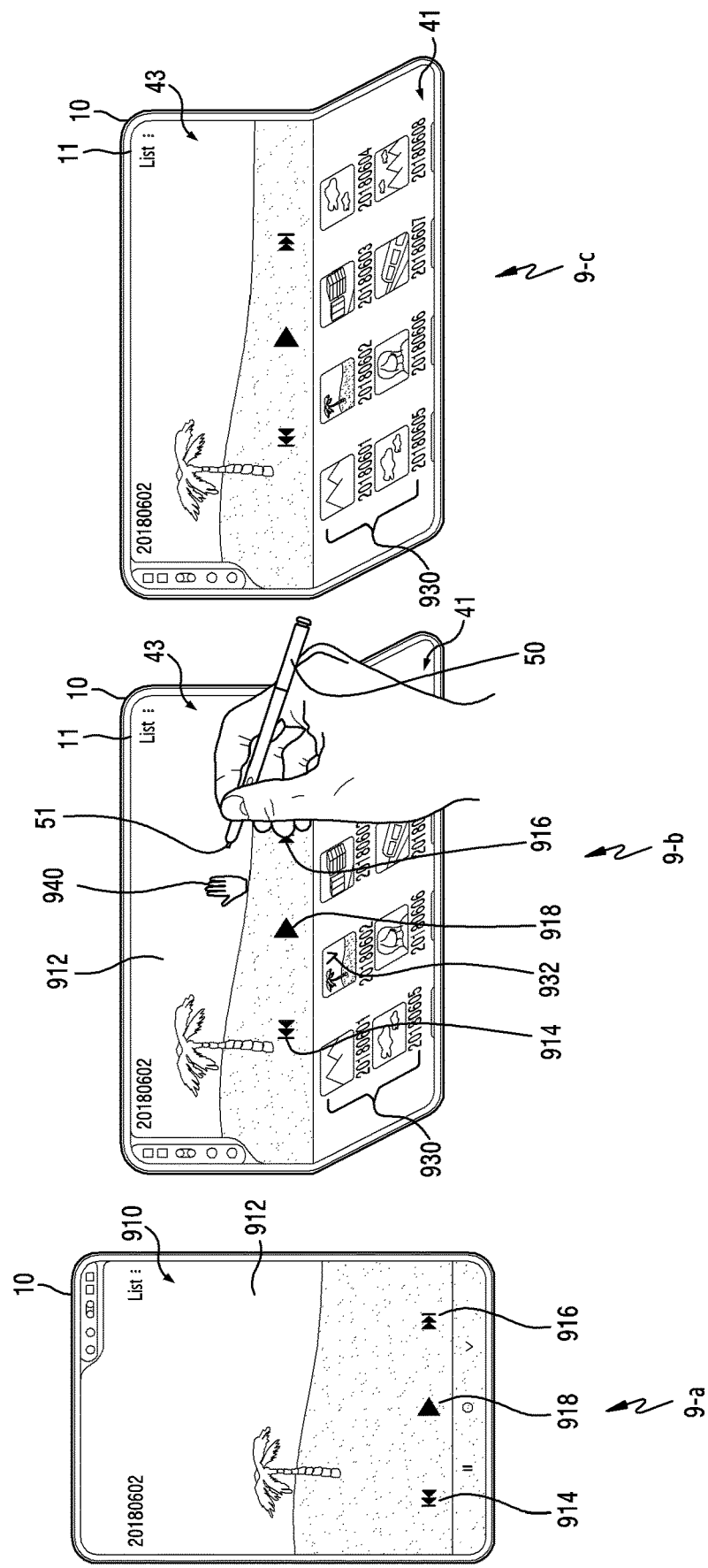
FIG. 9 illustrates a situation in which, when executing a video reproduction application, an electronic device according to an embodiment differently configures an external input depending on a change in the state of the electronic device.

FIG. 9 illustrates a situation in which, when executing a video reproduction application, an electronic device according to an embodiment differently configures an external input depending on a change in the state of the electronic device.

Referring to reference number 9-a of FIG. 9, in a first state in which the display 11 is unfolded, the electronic device 10 may execute a video reproduction application 910 and may display the executed video reproduction application 910 on the display 11.

According to an embodiment, in the first state, the electronic device 10 may display, on the display 11, a video file 912 being reproduced and one or more objects for controlling a video file being reproduced (e.g. a previous video viewing object 914, a following video viewing 916, a reproduction start object 918, etc.). The electronic device 10 may perform a preconfigured function, based on a user input of selecting the objects for controlling a video being reproduced.

According to certain embodiments, the electronic device 10 in the first state may execute a preconfigured function in response to a touch input or hovering input performed on the display 11. For example, the electronic device 10 may reproduce a previous video or a following video in response to a leftward/rightward moving touch-and-drag input or leftward/rightward moving hovering input, which is performed on the display 11.

Referring to reference number 9-b of FIG. 9, the state of the electronic device 10 may change from the first state in which the display 11 is unfolded to a second state in which the display 11 is partially folded.

According to an embodiment, the electronic device 10 may configure the display 11 to include the first region 41 and the second region 43. The first and second regions 41 and 43 may be differently configured with respect to external inputs (or user inputs) received by the first region 41 and the second region 43, respectively. For example, the electronic device 10 in the second state may be configured to acquire a touch input in the first region 41.

According to an embodiment, the electronic device 10 in the second state may identify the display 11 as the first region 41 and the second region 43, and then may display a video file list 930, which can be reproduced, in the first region 41. Further, the electronic device 10 may display, in the second region 43, a video file 912 being reproduced and one or more objects for controlling a video file being reproduced (e.g. the previous video viewing object 914, the following video viewing object 916, the reproduction start object 918, etc.). According to certain embodiments, the electronic device 10 may display a video file currently selected from the video file list 930 so as to be distinguished from the remaining video files. For example, the electronic device 10 may display a video file being reproduced while an icon 932 is added thereto, or may display a video file being reproduced by using a different color.

According to an embodiment, when the electronic device 10 in the second state acquires a touch input of selecting one video file from the video file list 930 displayed in the first region 41, the electronic device 10 may finish reproducing a video file being reproduced and may reproduce the selected video file.

According to an embodiment, the electronic device 10 in the second state may be configured to acquire a hovering input in the second region 43. For example, the electronic device 10 may display an object indicating a hovering position in one region of the display 11, which is most adjacent to one end 51 of the stylus pen 50. The object indicating a hovering position may be changed into and displayed in the form of an object 940 for selecting a video prior to or following a video being reproduced, for example, after a predetermined time elapses or in response to an input of pressing a button (not shown) included in the stylus pen 50.

The electronic device 10 may reproduce a video prior to or following a video being reproduced, in response to movement of the stylus pen 50.

According to an embodiment, the electronic device 10 may identically perform a function of the hovering input by using a touch-and-drag input performed in the second region 43. Alternatively, the electronic device 10 may also be configured such that the touch-and-drag input performs a function different from that of the hovering input.

Referring to reference number 9-c of FIG. 9, the electronic device 10 in the second state may be configured to acquire a touch input in the first region 41. For example, when the electronic device 10 in the second state acquires a user's touch input of touching one video file in the video file list 930 included in the first region 41, the electronic device 10 may reproduce the selected video file in the second region 43. Alternatively, when a touch-and-drag input is sensed in the first region 41 in which the video file list 930 is displayed, the electronic device 10 in the second state may display a video file list which has not been displayed in the first region 41.

According to an embodiment, the electronic device 10 may identically perform the function of the touch input or the touch-and-drag input by using a hovering input performed in the first region 41. Alternatively, the electronic device 10 may also be configured such that the hovering input performs a function which is different from that of the touch input or the touch-and-drag input.

Figure 10:
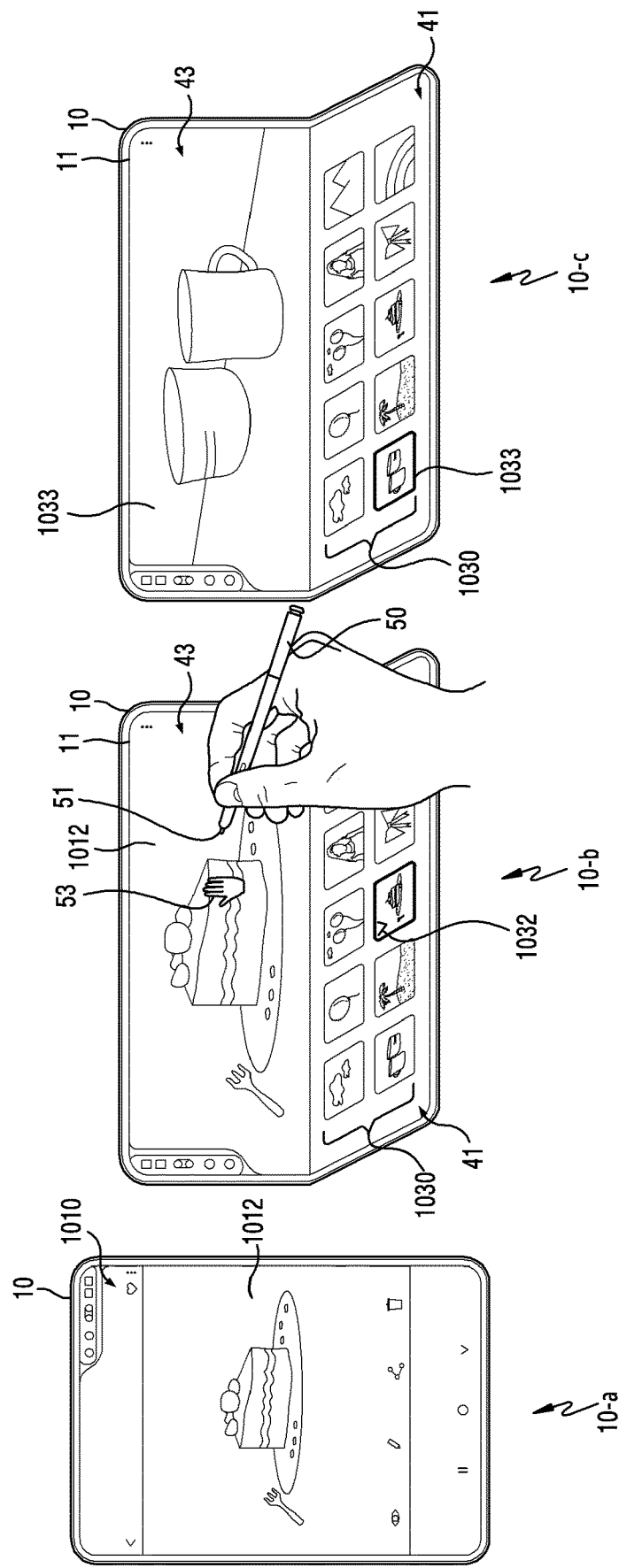
FIG. 10 illustrates a situation in which, when executing an image reproduction application, an electronic device according to an embodiment differently configures an external input to be acquired, depending on a change in the state of the electronic device.

FIG. 10 illustrates a situation in which, when executing an image reproduction application, an electronic device according to an embodiment differently configures an external input to be acquired, depending on a change in the state of the electronic device.

Referring to reference number 10-a of FIG. 10, in a first state in which the display 11 is unfolded, the electronic device 10 may execute an image reproduction application 1010 and may display an image 1012 on the display 11.

According to an embodiment, the electronic device 10 in the first state may execute a preconfigured function in response to a touch input or hovering input performed on the display 11. For example, the electronic device 10 in the first state may reproduce a previous image or a following image in response to a leftward/rightward moving touch-and-drag input or leftward/rightward moving hovering input, which is performed on the display 11.

Referring to reference number 10-b of FIG. 10, the state of the electronic device 10 may change from the first state in which the display 11 is unfolded to a second state in which the display 11 is partially folded.

According to an embodiment, in response to changing to the second state, the electronic device 10 may configure the display 11 to include the first region 41 and the second region 43. The first and second regions 41 and 43 may be differently configured with respect to external inputs (or user inputs) received by the first region 41 and the second region 43, respectively. For example, the electronic device 10 in the second state may be configured to acquire a touch input in the first region 41.

According to an embodiment, the electronic device 10 may identify the display 11 as the first region 41 and the second region 43, and then may display an image file list 1030 in the first region 41. Further, the electronic device 10 may display the image 1012 in the second region 43. According to certain embodiments, the electronic device 10 may display an image file currently selected from the image file list 1030 so as to be distinguished from the remaining image files. For example, the electronic device 10 may display a current displayed image file while an icon 1032 is added thereto, or may display the edge of the current displayed image file by using a different color.

According to an embodiment, when the electronic device 10 in the second state acquires a touch input of selecting one image file from the image file list 1030 displayed in the first region 41, the electronic device 10 may finish displaying a current displayed image file and may display the selected image file in the second region 43.

According to an embodiment, the electronic device 10 in the second state may be configured to acquire a hovering input in the second region 43. For example, the electronic device 10 may display an object indicating a hovering position in one region of the display 11, which is most adjacent to one end 51 of the stylus pen 50. The object indicating a hovering position may be changed into and displayed in the form of an object 53 for selecting an image prior to or following an image being displayed, for example, after a predetermined time elapses or in response to an input of pressing a button (not shown) included in the stylus pen 50.

The electronic device 10 may display an image prior to or following a current displayed image, in response to movement of the stylus pen 50.

According to an embodiment, the electronic device 10 may identically perform a function of the hovering input by using a touch-and-drag input performed in the second region 43. Alternatively, the electronic device 10 may also be configured such that the touch-and-drag input performs a function different from that of the hovering input.

Referring to reference number 10-*c* of FIG. 10, the electronic device 10 in the second state may be configured to acquire a touch input in the first region 41. For example, when the electronic device 10 acquires a user's touch input of touching one image file 1033 in the image file list 1030, the electronic device 10 may display the selected image file 1033 in the second region 43. Alternatively, when a touch-and-drag input is sensed in the region in which the image file list 1030 is displayed, the electronic device 10 may display an image file list which has not been displayed in the first region 41.

According to an embodiment, the electronic device 10 in the second state may identically perform the function of the touch input or the touch-and-drag input by using a hovering input performed in the first region 41. Alternatively, the electronic device 10 may also be configured such that the hovering input performs a function which is different from that of the touch input or the touch-and-drag input.

Figure 11:
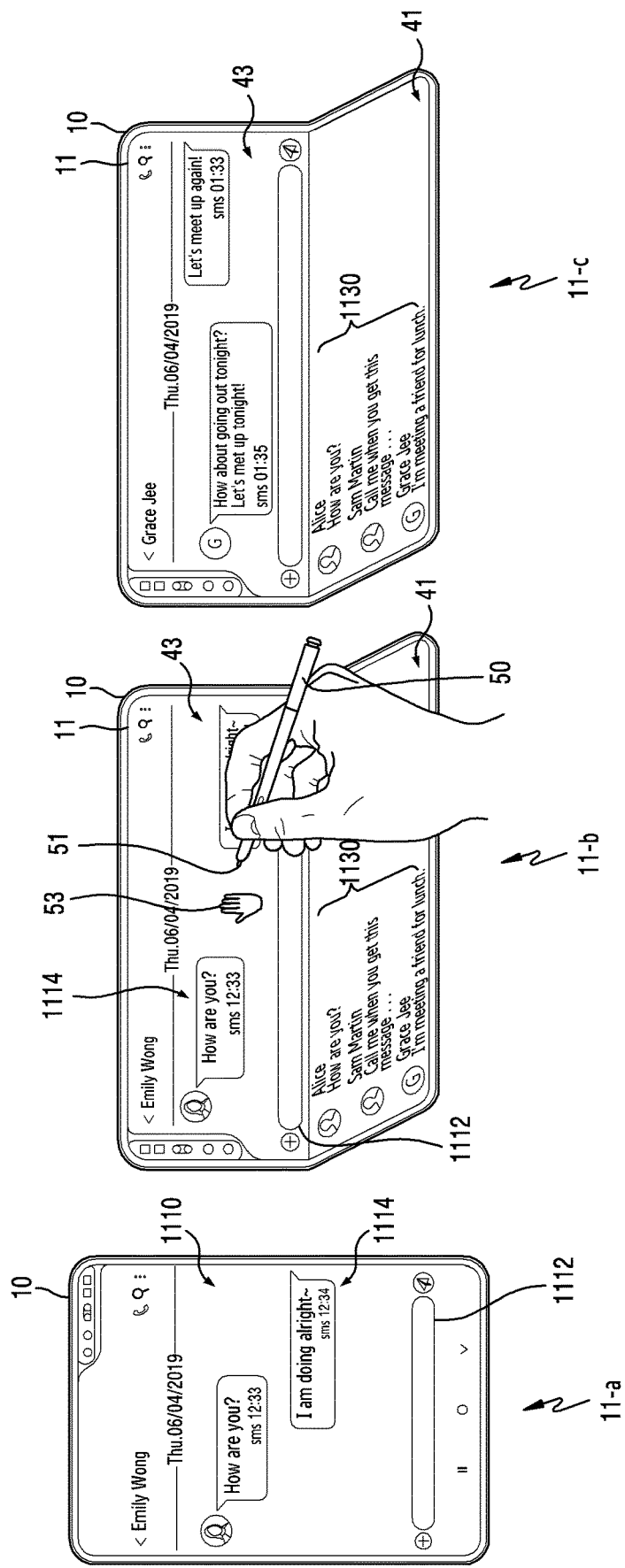
FIG. 11 illustrates a situation in which, when executing a messenger application, an electronic device according to an embodiment differently configures an external input to be acquired, depending on a change in the state of the electronic device.

FIG. 11 illustrates a situation in which, when executing a messenger application, an electronic device according to an embodiment differently configures an external input to be acquired, depending on a change in the state of the electronic device.

Referring to reference number 11-*a* of FIG. 11, in a first state in which the display 11 is unfolded, the electronic device 10 may execute a messenger application 1110 and may display the executed messenger application 1110 on the display 11.

According to an embodiment, the electronic device 10 may display, on the display 11, display a text input object 1112 and a chat window 1114 for displaying a pre-input text or pre-transmitted image. The chat window 1114 may be, for example, a screen which shows contents input by a user and a counterpart, who share texts and other data (e.g. a text file, an image file, a video file, etc.) by using the messenger application 1110.

Referring to reference number 11-*b* of FIG. 11, the state of the electronic device 10 may change from the first state in which the display 11 is unfolded to a second state in which the display 11 is partially folded.

According to an embodiment, in response to changing to the second state, the electronic device 10 may identify the display 11 as the first region 41 and the second region 43.

The first and second regions 41 and 43 may be differently configured with respect to external inputs (or user inputs) received by the first region 41 and the second region 43, respectively. For example, the electronic device 10 in the second state may be configured to acquire a touch input in the first region 41.

According to an embodiment, the electronic device 10 in the second state may identify the display 11 as the first region 41 and the second region 43, and then may display a chat window list 1130 in the first region 41 and may display, in the second region 43, the text input object 1112 and the chat window 1114 for displaying a pre-input text or a pre-transmitted image. According to certain embodiments, the electronic device 10 may display a chat window currently selected from the chat window list 1130 so as to be distinguished from the remaining chat windows. For example, the electronic device 10 may display a current displayed chat window while an icon 1032 is added thereto, or may display the edge of the current displayed chat window by using a different color.

According to an embodiment, when the electronic device 10 in the second state acquires a touch input of selecting one chat window from the chat window list 1130 displayed in the first region 41, the electronic device 10 may finish displaying a current displayed chat window and may display a content of the selected chat window in the second region 43.

According to an embodiment, the electronic device 10 in the second state may be configured to acquire a hovering input in the second region 43. For example, the electronic device 10 may display an object indicating a hovering position in one region of the display 11, which is most adjacent to one end 51 of the stylus pen 50. The object indicating a hovering position may be changed into and displayed in the form of an object 53 for selecting a chat window prior to or following a chat window being displayed, for example, after a predetermined time elapses or in response to an input of pressing a button (not shown) included in the stylus pen 50.

The electronic device 10 may display a chat window prior to or following a current displayed chat window, in response to movement of the stylus pen 50.

According to an embodiment, the electronic device 10 may identically perform a function of the hovering input by using a touch-and-drag input performed in the second region 43. Alternatively, the electronic device 10 may also be configured such that the touch-and-drag input performs a function different from that of the hovering input.

Referring to reference number 11-*c* of FIG. 11, the electronic device 10 in the second state may be configured to acquire a touch input in the first region 41. For example, when the electronic device 10 acquires a user's touch input of touching one chat window in the chat window list 1130 included in the first region 41, the electronic device 10 may display a content of the selected chat window in the second region 43. Alternatively, when a touch-and-drag input is sensed in the first region 41 in which the chat window list 1130 is displayed, the electronic device 10 may display a chat window list which has not been displayed in the first region 41.

According to an embodiment, the electronic device 10 in the second state may identically perform the function of the touch input or the touch-and-drag input by using a hovering input performed in the first region 41. Alternatively, the electronic device 10 may also be configured such that the hovering input performs a function which is different from that of the touch input or the touch-and-drag input.

Figure 12:
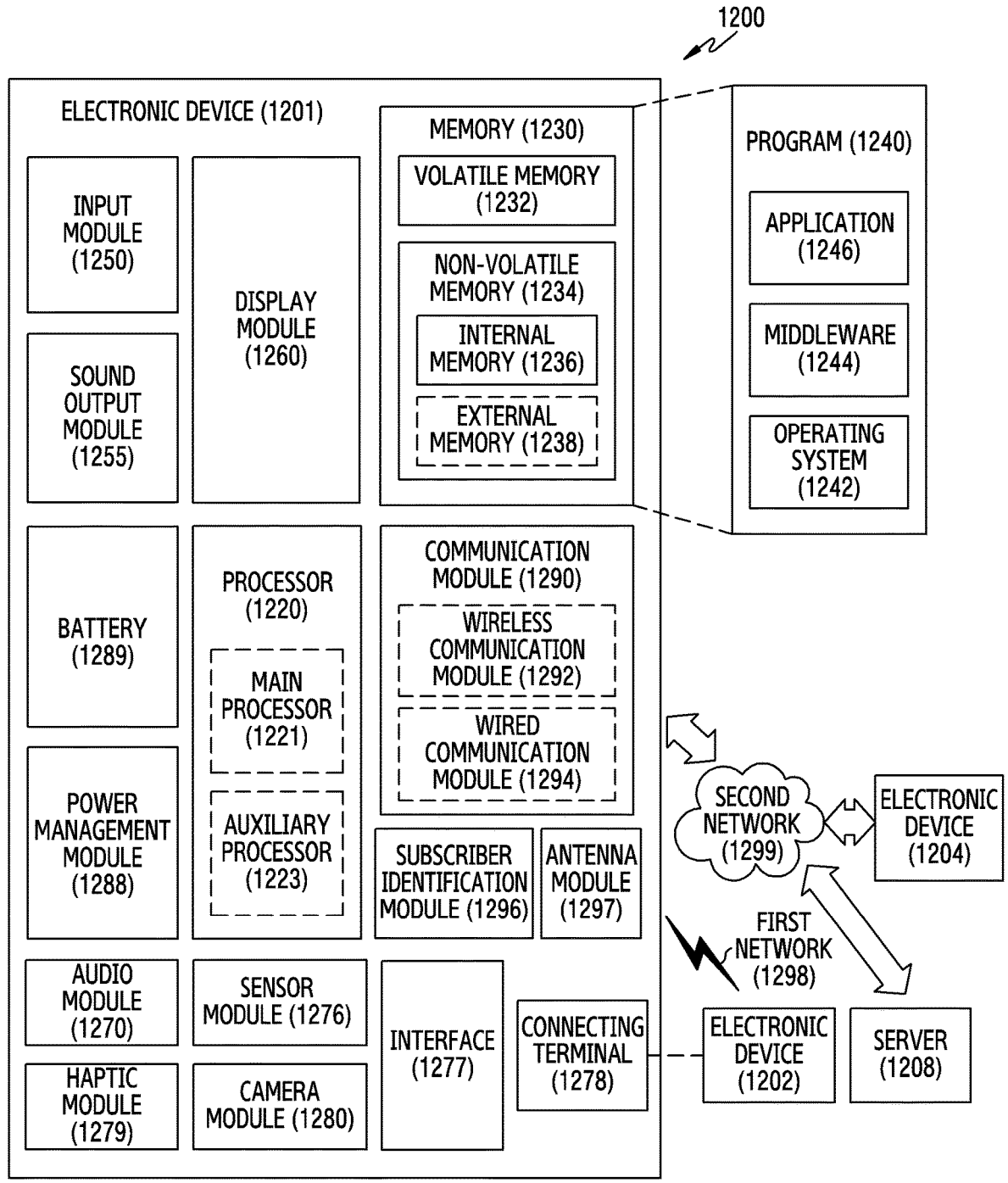
FIG. 12 is a block diagram of an electronic device in a network environment according to certain embodiments.

FIG. 12 is a block diagram illustrating an electronic device 1201 in a network environment 1200 according to certain embodiments. The electronic device 1201 of FIG. 12 may include the electronic device 10 of FIG. 1. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one (e.g., the connecting terminal 1278) of the components may be omitted from the electronic device 1201, or one or more other components may be added in the electronic device 1201. In some embodiments, some (e.g., the sensor module 1276, the camera module 1280, or the antenna module 1297) of the components may be implemented as single integrated circuitry.

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, if the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

According to an embodiment, when the state of an electronic device changes from a first state in which the display 11 is unfolded to a second state in which the display 11 is at least partially folded, a processor 1220 may control the display 11 such that a first region of the display 11 acquires a touch input and a second region of the display 11 acquires a non-touch input.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., a neural network processing device) may include a hardware structure specialized for processing an artificial intelligence model. The artificial intelligence model may be created through machine learning. Such learning may be performed, for example, in the electronic device 1201 on which artificial intelligence is performed, or may be performed through a separate server (e.g., the server 1208). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

According to an embodiment, a memory 1230 may store one or more instructions that, when being executed, cause, when the state of the electronic device changes from the first state in which the display 11 is unfolded to the second state in which the display 11 is at least partially folded, the display 11 to be controlled such that the first region of the display 11 acquires a touch input and the second region of the display 11 acquires a non-touch input.

The program 1240 may be stored in the memory 1230 as software, and may include, for example, an operating system (OS) 1242, middleware 1244, or an application 1246.

The input module 1250 may receive a command or data to be used by other component (e.g., the processor 1220) of the electronic device 1201, from the outside (e.g., a user) of the electronic device 1201. The input module 1250 may include, for example, a microphone, a mouse, a keyboard, a key (e.g., button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for an incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255, or an external electronic device (e.g., an electronic device 1202)(e.g., a speaker or a headphone) directly or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device 1204 via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify or authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 1292 may support, for example, a high frequency band (e.g., an mmWave band) to achieve a high data rate. The wireless communication module 1292 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 1292 may support various requirements defined in the electronic device 1201, an external electronic device (e.g., the electronic device 1204), or a network system (e.g., the second network 1299). According to an embodiment, the wireless communication module 1292 may support a peak data rate (e.g., 20 Gbps or more) for realizing eMBB, a loss coverage (e.g., 1264 dB or less) for realizing mMTC, or U-plane latency (e.g., 0.5 ms or less or a round trip of 1 ms or less for each of downlink (DL) and uplink (UL)) for realizing URLCC.

The antenna module 1297 may transmit or receive a signal or power to or from the outside (e.g., the external electronic device) of the electronic device 1201. According to an embodiment, the antenna module 1297 may include an antenna including a radiating element implemented using a conductive material or a conductive pattern formed in or on a substrate (e.g., PCB). According to an embodiment, the antenna module 1297 may include a plurality of antennas (e.g., array antenna). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to certain embodiments, the antenna module 1297 may include an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To this end, for example, technologies of cloud computing, distributed computing, Mobile Edge Computing (MEC), or client-server computing may be used. The electronic device 1201 may provide an ultra-low latency service by using, for example, distributed computing or mobile edge computing. In another embodiment, the external electronic device 1204 may include an Internet of Things (IoT) device. The server 1208 may be an intelligent server using machine learning and/or neural networks. According to an embodiment, the external electronic device 1204 or the server 1208 may be included in the second network 1299. The electronic device 1201 may be applied to an intelligent service (e.g., a smart home, a smart city, a smart car, or health care) based on a 5G communication technique and an IoT related technique.

Figure 13:
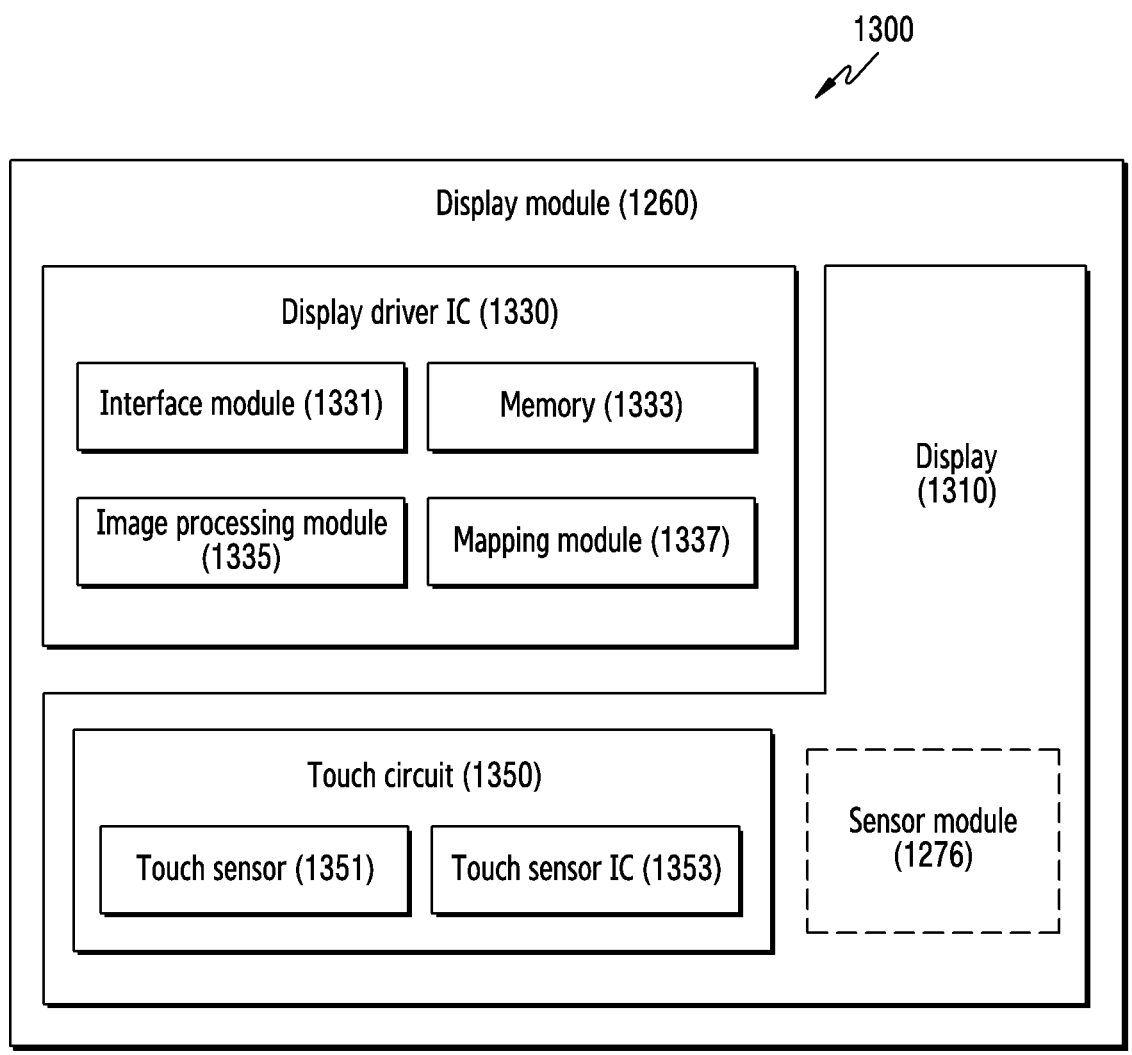
FIG. 13 is a block diagram of a display module according to certain embodiments.

FIG. 13 is a block diagram 1300 illustrating the display module 1260 according to certain embodiments. Referring to FIG. 13, the display module 1260 may include a display 1310 and a display driver integrated circuit (DDI) 1330 to control the display 1310. The DDI 1330 may include an interface module 1331, memory 1333 (e.g., buffer memory), an image processing module 1335, or a mapping module 1337. The DDI 1330 may receive image information that contains image data or an image control signal corresponding to a command to control the image data from another component of the electronic device 1201 via the interface module 1331. For example, according to an embodiment, the image information may be received from the processor 1220 (e.g., the main processor 1221 (e.g., an application processor)) or the auxiliary processor 1223 (e.g., a graphics processing unit) operated independently from the function of the main processor 1221. The DDI 1330 may communicate, for example, with touch circuitry 1250 or the sensor module 1276 via the interface module 1331. The DDI 1330 may also store at least part of the received image information in the memory 1333, for example, on a frame by frame basis.

The image processing module 1335 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1310.

The mapping module 1337 may generate a voltage value or a current value corresponding to the image data pre-processed or post-processed by the image processing module 1335. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1310 may be driven, for example, based at least in part on the voltage value or the current value such that visual information (e.g., a text, an image, or an icon) corresponding to the image data may be displayed via the display 1310.

According to an embodiment, the display module 1260 may further include the touch circuitry 1350. The touch circuitry 1350 may include a touch sensor 1351 and a touch sensor IC 1353 to control the touch sensor 1351. The touch sensor IC 1353 may control the touch sensor 1351 to sense a touch input or a hovering input with respect to a certain position on the display 1310. To achieve this, for example, the touch sensor 1351 may detect (e.g., measure) a change in a signal (e.g., a voltage, a quantity of light, a resistance, or a quantity of one or more electric charges) corresponding to the certain position on the display 1310. The touch circuitry 1350 may provide input information (e.g., a position, an area, a pressure, or a time) indicative of the touch input or the hovering input detected via the touch sensor 1351 to the processor 1220. According to an embodiment, at least part (e.g., the touch sensor IC 1353) of the touch circuitry 1350 may be formed as part of the display 1310 or the DDI 1330, or as part of another component (e.g., the auxiliary processor 1223) disposed outside the display module 1260.

According to an embodiment, when the state of the electronic device 10 changes to the second state, the processor 1220 may be configured to control a touch sensor 1351 such that the touch sensor 1351 does not sense a touch input in the second region 43. Alternatively, the processor 1220 may control a touch sensor IC 1353 so as not to acquire a touch input sensed in the second region 43.

According to an embodiment, the display module 1260 may further include at least one sensor (e.g., a fingerprint sensor, an iris sensor, a pressure sensor, or an illuminance sensor) of the sensor module 1276 or a control circuit for the at least one sensor. In such a case, the at least one sensor or the control circuit for the at least one sensor may be embedded in one portion of a component (e.g., the display 1310, the DDI 1330, or the touch circuitry 1250)) of the display module 1260. For example, when the sensor module 1276 embedded in the display module 1260 includes a biometric sensor (e.g., a fingerprint sensor), the biometric sensor may obtain biometric information (e.g., a fingerprint image) corresponding to a touch input received via a portion of the display 1310. As another example, when the sensor module 1276 embedded in the display module 1260 includes a pressure sensor, the pressure sensor may obtain pressure information corresponding to a touch input received via a partial or whole area of the display 1310. According to an embodiment, the touch sensor 1351 or the sensor module 1276 may be disposed between pixels in a pixel layer of the display 1310, or over or under the pixel layer.

Various embodiment may provide a method in which an electronic device acquires different external inputs depending on the arrangement state of a display. Further, certain embodiments may provide a method in which an electronic device executes different functions depending on regions of a display even when the same external input is acquired. In addition, various effects, which can be directly or indirectly understood through the disclosure, may be provided.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1240) including one or more instructions that are stored in a storage medium (e.g., internal memory 1236, or external memory 1238) that is readable by a machine (e.g., the electronic device 10, 1201). For example, a processor (e.g., the processor 1220) of the machine (e.g., the electronic device 10, 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separated and disposed to other component. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
a foldable display that is at least unfoldable to substantially a 180-degree angle, and partially foldable to degrees less than the 180-degree angle;

at least one processor; and at least one memory, storing one or more instructions that, when executed, cause the processor to:

when the foldable display is changed from an unfolded state to a partially folded state, set a first region of the foldable display to accept contact-based touch inputs, and set a second region of the foldable display to accept hover-based touch inputs and ignore the contact-based touch inputs in the partially folded state.

2. The electronic device of claim 1, further comprising:

a first housing structure supporting the first region of the foldable display;

a second housing structure supporting the second region of the foldable display; and a hinge forming a folding axis between the first housing structure and the second housing structure, wherein the first region and the second region of the foldable display are defined with reference to the folding axis, and wherein the first region is further set to ignore the non-contact-based touch inputs in the partially folded state.

3. The electronic device of claim 2, wherein a height of the first region is approximately equivalent to a height of the hinge forming the folding axis.

4. The electronic device of claim 1, wherein the instructions further cause the processor to: control the foldable display to ignore touch inputs received in the second region.

5. The electronic device of claim 1, wherein the instructions further cause the processor to:

display a first object associated with execution of a preconfigured first function when the hover-based touch input is sensed in the first region; and display a second object associated with execution of a preconfigured second function when the hover-based touch input is sensed in the second region.

6. The electronic device of claim 1, wherein the instructions further cause the processor to:

display, in the first region, a keyboard;

display, in the second region, an input field in which text is displayable; and when a voice input is detected while the hover-based touch input is detected to the second region, extract text from the voice input and insert the extracted text into the input field.

7. The electronic device of claim 6, wherein the extracted text is displayed in the input field with other text input by keyboard, and wherein the instructions further cause the processor to:

display the extracted text with a visual effect distinguishing the extracted text from the other text input by keyboard.

8. The electronic device of claim 1, wherein the instructions further cause the processor to:

display a keyboard in the first region, and display input text in the second region; and when an image is acquired while the hover-based touch input is detected in the second region, display the acquired image at a location on the foldable display where the hover-based touch input is detected.

9. The electronic device of claim 8, wherein the instructions further cause the processor to:

display, in the first region, the acquired image with a correction object selectable to execute an image correction function.

10. The electronic device of claim 9, wherein the instructions further cause the processor to:

when the image displayed in the first region is corrected by the image correction function, correct the image displayed in the second region by applying the image correction function applied to the image displayed in the first region to the image displayed in the second region.

11. The electronic device of claim 1, wherein the instructions further cause the processor to:

when the foldable display is changed to the unfolded state, setting both the first region and the second region to accept both touch inputs and non-touch inputs.

12. A method of an electronic device, the method comprising:

detecting, by at least one processor, that a foldable display of the electronic device changes from an unfolded state of substantially a 180-degree angle to a partially folded state including a degree less than the 180-degree angle;

configuring a first region of the foldable display to accept contact-based touch inputs in the partially folded state; and configuring a second region of the foldable display to accept hover-based touch inputs in the partially folded state and ignore the contact-based touch inputs in the partially folded state.

13. The method of claim 12, wherein the first region of the foldable display is supported by a first housing structure, the second region of the foldable display is supported by a second housing structure; and wherein the first housing structure and the second housing structure are coupled by a hinge forming a folding axis between the first housing structure and the second housing structure, wherein the first region is further set to ignore the non-contact-based touch inputs in the partially folded state.

14. The method of claim 13, wherein a height of the first region is approximately equivalent to a height of the hinge forming the folding axis.

15. The method of claim 12, further comprising configuring, by the at least one processor, the foldable display to ignore touch inputs received to the second region.

16. The method of claim 12, further comprising:

displaying a first object associated with execution of a preconfigured first function when the hover-based touch input is sensed in the first region; and displaying a second object associated with execution of a preconfigured second function when the hover-based touch input is sensed in the second region.

17. The method of claim 12, further comprising:

displaying, in the first region, a keyboard;

displaying, in the second region, an input field in which text is displayable; and when a voice input is detected while the hover-based touch input is detected to the second region, extracting text from the voice input and inserting the extracted text into the input field.

18. The method of claim 17, wherein the extracted text is displayed in the input field with other text input by keyboard, the method further comprising:

displaying the extracted text with a visual effect distinguishing the extracted text from the other text input by keyboard.

19. The method of claim 12, further comprising:

displaying a keyboard in the first region, and displaying input text in the second region; and when an image is acquired while the hover-based touch input is detected in the second region, displaying the acquired image at a location on the foldable display where the hover-based touch input is detected.

20. The method of claim 19, further comprising:

displaying, in the first region, the acquired image with a correction object selectable to execute an image correction function.

\* \* \* \* \*